US011378159B2

(12) United States Patent
Campbell

(10) Patent No.: US 11,378,159 B2
(45) Date of Patent: Jul. 5, 2022

(54) WICKING TERMINATION SYSTEM

(71) Applicant: Richard V. Campbell, Havana, FL (US)

(72) Inventor: Richard V. Campbell, Havana, FL (US)

(73) Assignee: Bright Technologies, LLC, Havana, FL (US)

( * ) Notice: Subject to any disclaimer, the term of this patent is extended or adjusted under 35 U.S.C. 154(b) by 411 days.

(21) Appl. No.: 16/119,073

(22) Filed: Aug. 31, 2018

(65) Prior Publication Data

US 2019/0368573 A1 Dec. 5, 2019

Related U.S. Application Data

(60) Provisional application No. 62/679,252, filed on Jun. 1, 2018.

(51) Int. Cl.
| | |
|---|---|
| *F16G 11/04* | (2006.01) |
| *B29C 65/48* | (2006.01) |
| *B29C 65/00* | (2006.01) |
| *B65H 69/02* | (2006.01) |
| *F16G 11/02* | (2006.01) |
| *B29L 31/00* | (2006.01) |

(52) U.S. Cl.
CPC .......... *F16G 11/042* (2013.01); *B29C 65/48* (2013.01); *B29C 66/69* (2013.01); *B65H 69/02* (2013.01); *F16G 11/025* (2013.01); *B29L 2031/707* (2013.01)

(58) Field of Classification Search
CPC ...... F16G 11/042; F16G 11/025; B29C 65/48; B29C 66/69; Y10T 403/473; B65H 69/02; B29L 2031/707
See application file for complete search history.

(56) References Cited

U.S. PATENT DOCUMENTS

| | | | | |
|---|---|---|---|---|
| 3,705,445 A | * | 12/1972 | Smollinger | F16G 11/042 403/268 |
| 6,957,485 B2 | * | 10/2005 | Campbell | F16G 11/042 29/857 |
| 7,237,336 B2 | * | 7/2007 | Campbell | B29C 63/0013 29/867 |
| 7,543,360 B2 | * | 6/2009 | Campbell | F16G 11/042 24/122.6 |
| 7,770,265 B2 | * | 8/2010 | Campbell | F16G 11/042 24/122.6 |
| 7,818,849 B2 | * | 10/2010 | Campbell | H02G 15/068 24/122.6 |
| 8,048,357 B2 | * | 11/2011 | Barefield | B29C 67/246 264/261 |
| 8,215,886 B2 | * | 7/2012 | Campbell | F16G 11/05 411/383 |

(Continued)

*Primary Examiner* — Robert Sandy
*Assistant Examiner* — Louis A Mercado
(74) *Attorney, Agent, or Firm* — J. Wiley Horton

(57) ABSTRACT

A termination system which improves the consistency and repeatability of the wicking of the liquid potting compound in the transition area between the potted and the imported filaments. The termination system controllably compresses the filaments within the transition area to produce repeatable wicking. The potting compound selected and the degree of compression employed combine to produce a desired wicking effect.

12 Claims, 23 Drawing Sheets

(56) References Cited

U.S. PATENT DOCUMENTS

| | | | | |
|---|---|---|---|---|
| 8,236,219 B2* | 8/2012 | Campbell | ............. | B29C 67/246 |
| | | | | 264/261 |
| 8,371,015 B2* | 2/2013 | Campbell | ............. | F16G 11/042 |
| | | | | 29/525.01 |
| 9,132,890 B2* | 9/2015 | Baron | .................... | B63B 21/04 |
| 9,791,337 B2* | 10/2017 | Campbell | ............... | D07B 1/185 |
| 9,835,228 B2* | 12/2017 | Campbell | ............... | F16B 39/20 |
| 9,840,044 B2* | 12/2017 | Campbell | ............... | B29C 65/48 |
| 10,434,724 B2* | 10/2019 | Campbell | ......... | B29C 66/91221 |
| 10,543,573 B2* | 1/2020 | Campbell | ............. | F16G 11/042 |
| 10,563,727 B2* | 2/2020 | Campbell | ............... | B21F 15/04 |
| 10,656,033 B2* | 5/2020 | Campbell | ................ | D07B 1/18 |
| 2005/0208829 A1* | 9/2005 | Campbell | ............. | H01R 13/40 |
| | | | | 439/587 |
| 2006/0096089 A1* | 5/2006 | Campbell | ............. | F16G 11/042 |
| | | | | 29/857 |
| 2015/0300452 A1* | 10/2015 | Campbell | ............. | F16G 11/042 |
| | | | | 403/275 |
| 2017/0356481 A1* | 12/2017 | Campbell | ............... | F16G 11/09 |
| 2018/0245666 A1* | 8/2018 | Campbell | ................ | D07B 5/00 |
| 2018/0320756 A1* | 11/2018 | Campbell | ......... | B29C 45/14262 |
| 2019/0178342 A1* | 6/2019 | Campbell | ................ | B66B 7/08 |
| 2019/0346017 A1* | 11/2019 | Campbell | ............... | D07B 1/14 |
| 2019/0368573 A1* | 12/2019 | Campbell | ............. | F16G 11/025 |

* cited by examiner

WICKING TERMINATION SYSTEM

CROSS-REFERENCES TO RELATED APPLICATIONS

Not Applicable.

STATEMENT REGARDING FEDERALLY SPONSORED RESEARCH OR DEVELOPMENT

Not Applicable.

MICROFICHE APPENDIX

Not Applicable

BACKGROUND OF THE INVENTION

1. Field of the Invention

This invention relates to the field of tensile strength members. More specifically, the invention comprises a system for creating repeatable wicking characteristics in a potted termination for a tensile strength member incorporating synthetic filaments. The invention creates certain wicking characteristics and uses those characteristics to improve the termination's mechanical properties.

2. Description of the Related Art

Tensile strength members most generally be connected to other components in order to be useful. A flexible cable provides a good example. The cable must generally include some type of end-fitting so that it can be transmit a load. For example, a cable used in a hoist generally includes a lifting hook on its free end. This lifting hook may be rigged to a load. The assembly of an end-fitting and the portion of the cable to which it is attached is generally called a "termination."

The prior art approaches to adding a termination are explained in detail in commonly-owned U.S. Pat. Nos. 7,237,336; 8,048,357; 8,236,219 and 8,371,015; which are hereby incorporated by reference. The prior art approaches are also explained in detail in commonly-owned U.S. patent application Ser. Nos. 13/678,664 and 15/710,692. These published pending applications are also hereby incorporated by reference.

The present invention is particularly applicable to tensile strength members which incorporate advanced high-strength synthetic filaments. The term "filament" is used in this disclosure to describe the smallest constituent of a tensile strength member. These filaments typically have a very small cross section, analogous to that of human hair. The filaments are grouped together in different ways to make a particular known construction. As an example, a "twelve-strand cable" typically includes a braided construction of 12 individual strands. Each strand is a helically twisted cluster of many filaments. For such a construction the filament is the smallest element, the strand is an intermediate element, and the cable is the largest element. The reader should note that many cable constructions employ more than three levels of grouping.

The synthetic filaments themselves are made from many different materials. These include DYNEEMA (ultra-high-molecular-weight polyethylene), SPECTRA (ultra-high-molecular-weight polyethylene), TECHNORA (aramid), TWARON (p-phenylene terephthalamide), KEVLAR (para-aramid synthetic fiber), VECTRAN (a fiber spun from liquid-crystal polymer), PRO (poly(p-phenylene-2,6-benzobisoxazole)), carbon fiber, and glass fiber (among many others). The individual filaments are very strong in tension, but they are not very rigid. They also tend to have low surface friction. These facts make such synthetic filaments difficult to handle during the process of adding a termination and difficult to organize. The present invention is particularly applicable to terminations made of such high-strength filaments (either entirely of such filaments are including a substantial proportion of such filaments), for reasons which will be explained in the descriptive text to follow.

FIG. 1 shows an exemplary termination on a synthetic cable. Anchor 18 is attached to an end of cable 10 (Only a small length of the cable is shown, though it is typically much longer). The assembly shown is sectioned in half to show internal features (As the internal features are significant, all the views in this specification are sectioned in half). Anchor 18 can be attached to the cable by a variety of techniques. The version shown is attached by potting a length of filaments into an expanding cavity 22 within the anchor.

The term potting—which is well known to those skilled in the art—can be described as follows: The cable filaments are typically splayed into a diverging pattern and infused with liquid potting compound (using a variety of known techniques, either before or after the filaments are placed in the expanding cavity). The liquid potting impound is any substance which transitions from a liquid to a solid over time. The most common example would be a cross-linking liquid such as an epoxy or a polyester resin. Those skilled in the art know that such formulations often use two separate liquids which cross-link when mixed together. Such a liquid is mixed just prior to wetting the filaments.

The exposed filaments are at some point placed in expanding cavity 22 within anchor 18 (in some cases prior to wetting and in some cases after wetting with potting compound). Whether before or after placement within the expanding cavity, the filaments are thoroughly infused with liquid potting compound. The liquid potting compound hardens while the filaments remain in the expanding cavity, thereby locking the filaments to the anchor through mechanical interference with the expanding cavity. The anchor and the portion of cable locked therein are then collectively referred to as a termination. The reader should note that the expanding cavity can include many different wall profiles, other than the linear taper shown. Exemplary profiles are described in commonly-owned U.S. Pat. Nos. 7,770.265 and 7,818,849—which are hereby incorporated by reference.

Potted region 20 consists of filaments locked within the solidified potting compound. The anchor has a first end which is approximately even with the end of the cable and a second end proximate to the cable but distal to the end of the cable (the lower end in the orientation shown in the view).

The transition from the solid potted region to the freely flexing portion of the cable takes place across potting transition 24. The jagged depiction represents the fact that some liquid potting compound flows down through the gaps between the filaments, and that it flows irregularly based on many factors. It may be even more pronounced than shown in FIG. 1. FIG. 2 shows an example in which an even more irregular transition is formed.

Wicking is more precisely referred to as capillary flow. It occurs when the adhesive intermolecular forces between a liquid and the bounding material containing the liquid are stronger than the cohesive intermolecular forces holding the liquid together. In such a case the unequal forces form a concave meniscus, with the advancing edge of the meniscus "crawling" along the material that the liquid potting compound comes in contact with.

The selection of the potting compound used can have a significant impact on the wicking phenomenon. For example, potting compounds which have a low viscosity in the liquid state tend to wick over a longer distance than those having a higher viscosity. The surface-interface characteristics of the potting compound—such as its adhesive properties—can also influence this phenomenon.

FIG. 3 shows a cross-sectional view of the cable itself. The generally circular cross section is made up of many filaments 28. Voids 34 exist between these filaments prior to wetting with liquid potting compound. For synthetic cables, the filaments themselves are very small. The diameter of such filaments is often less than a human hair. Those familiar with the physics of wicking (capillary flow) will therefore realize that fluids having appropriate viscosities and adhesive properties will tend to wick through these small voids.

The wicking phenomenon gets its name from lamp wicks. A lamp wick is a generally fibrous material which when immersed in a fuel such as kerosene will draw the fuel upwards into a flame chamber. Wicking occurs even though the fuel must climb the vertical wick. Thus, the wicking phenomenon is powerful enough to overcome the force of gravity. Of course, gravity still influences the rate of wicking. Gravity can in fact be used to regulate the rate of wicking, such as by reorienting the wick.

Wicking is a natural phenomenon which will sometimes occur when wetting synthetic cables with liquid potting compound. The amount of wicking can be quite variable and, because the degree of wicking present alters the physical properties of the termination produced, this variability can be undesirable. As an example, poorly controlled wicking can result in a long solidified spike or spikes sticking downward into the freely flexing portion of the cable.

On the other hand, certain characteristics created by wicking can actually be favorable. Thus, it is desirable to create a termination which: (1) allows wicking to occur in a repeatable and consistent fashion; and (2) uses the wicking phenomenon to enhance the physical characteristics of the completed termination.

BRIEF SUMMARY OF THE PRESENT INVENTION

The present invention comprises a termination system which improves the consistency and repeatability of the wicking of the liquid potting compound in the transition area between the potted and the unpotted filaments. The termination laterally supports the filaments in this transition area so that mostly tensile stress is placed on the filaments within the wicking transition, and bending stresses are minimized.

Some of the liquid potting compound wicks along the filaments in the transition area, thereby reducing the tensile stress riser which normally occurs at the transition point between the freely flexing portion of a filament and the portion locked within the solidified potting compound. The invention thereby utilizes the natural wicking phenomenon to enhance the termination's mechanical properties.

The wicking in the transition area can be controlled by using the wall geometry of an anchor's internal passage to gradually compress the filaments. Alternatively, a separate compression sleeve can be added around the cable in the vicinity of the wicking transition. This compression sleeve can control the penetration of wicking "tendrils" into the freely flexing part of the cable. The compression sleeve can be wholly contained within the anchor, or may protrude somewhat from the anchor. The compression sleeve may be left in place after the potting compound hardens or may be removed if desired.

Figure 1:
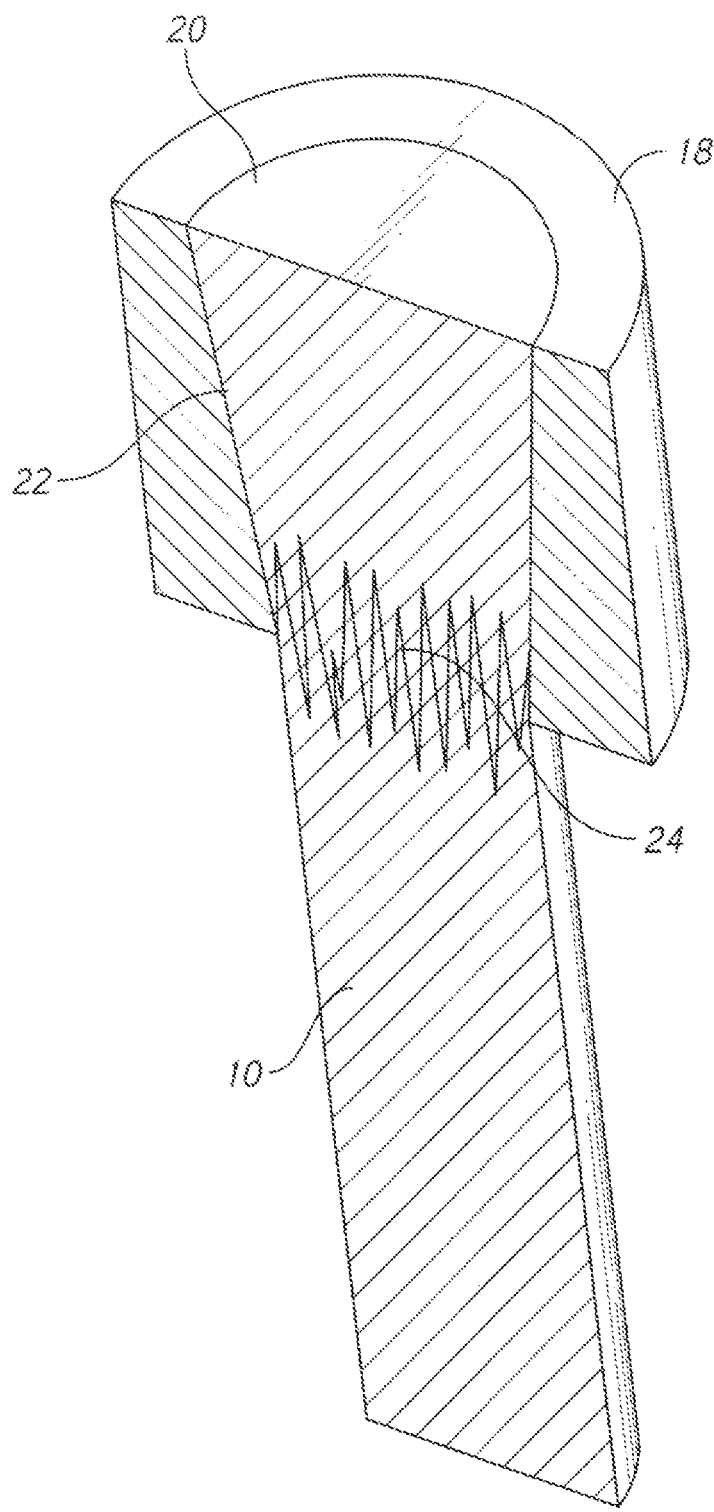
FIG. 1 is a sectioned perspective view, showing the interior of a potted termination.
Figure 2:
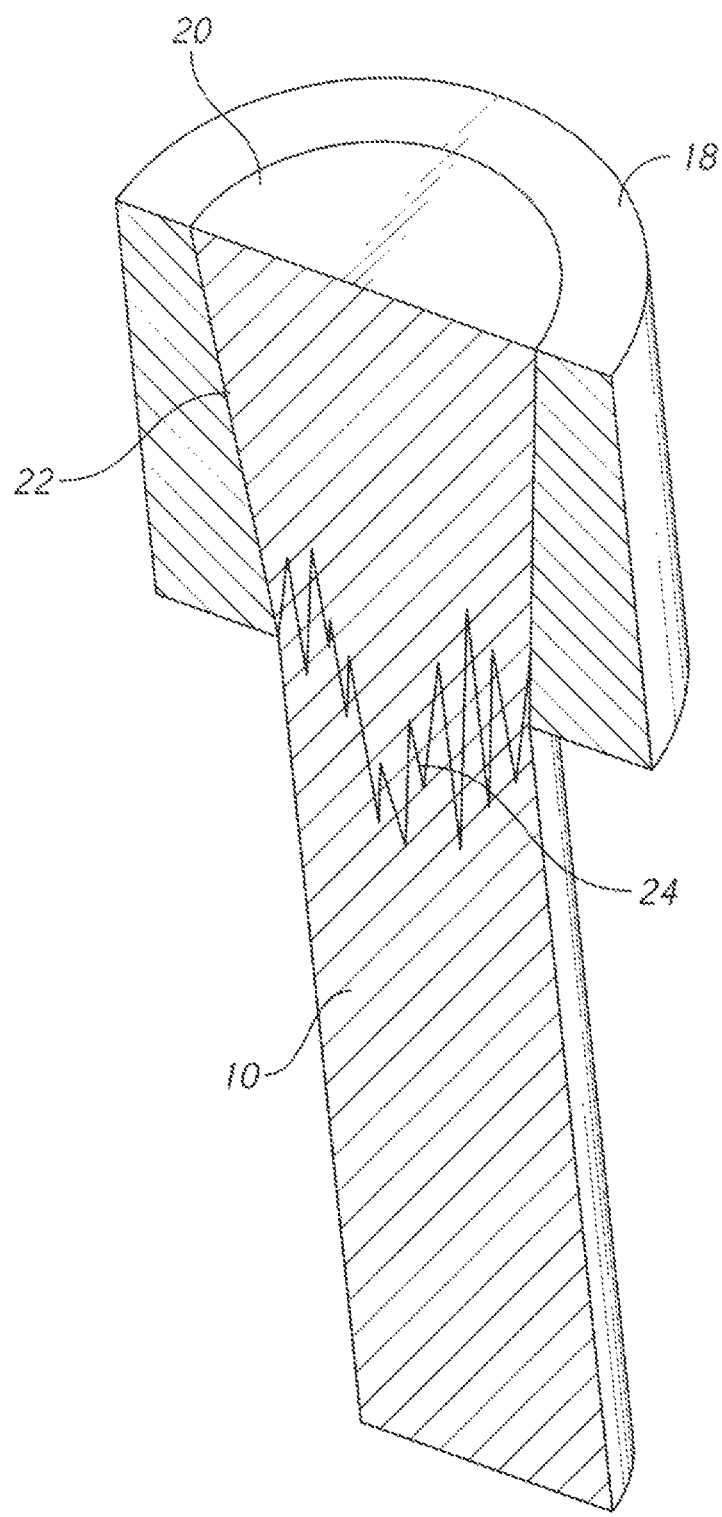
FIG. 2 is a sectioned perspective view, showing the interior of a potted termination.
Figure 3:
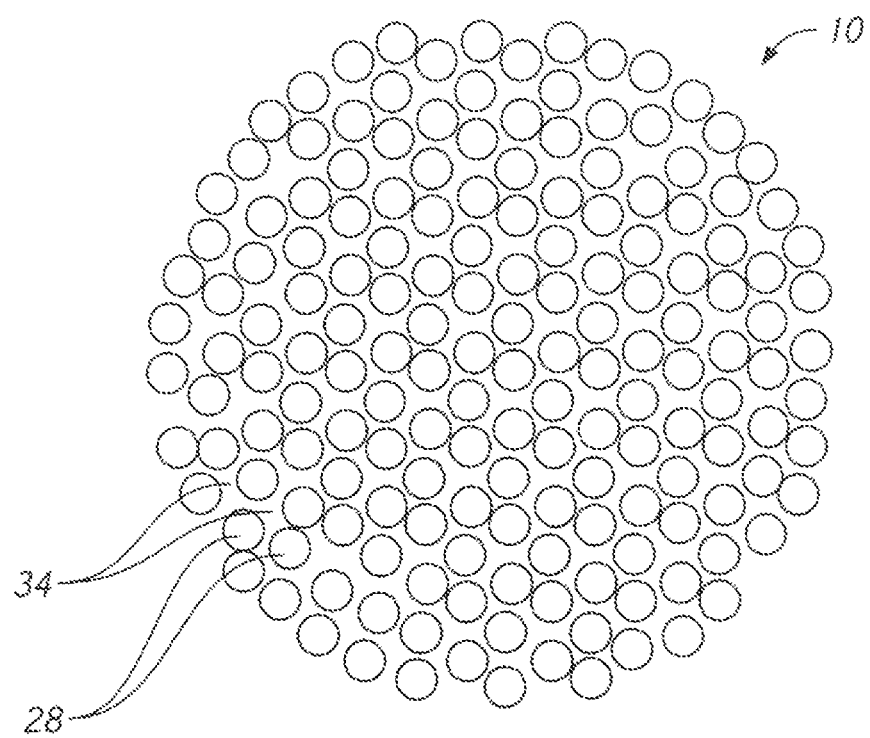
FIG. 3 is a cross-sectional view, showing the filaments of a cable.

REFERENCE NUMERALS IN THE DRAWINGS 10 cable
18 anchor
20 potted region
22 expanding cavity
24 potting transition 28 filament
30 wicking potting transition
32 tendril
34 void
36 freely flexing portion
38 straight portion
40 restraining collar
42 separate collar
44 wicking cavity
46 potting compound boundary
48 cavity
50 compression sleeve
52 splayed region
54 undisturbed region
58 compression sleeve retaining lip
62 tapered compression sleeve
64 Upend side wall
66 coupler
68 strand
70 strand termination
72 threaded engagement
74 stud
76 cable
78 collector
80 loading eye
82 nut
84 multiple cavity anchor

DETAILED DESCRIPTION OF THE INVENTION

Figure 4A:
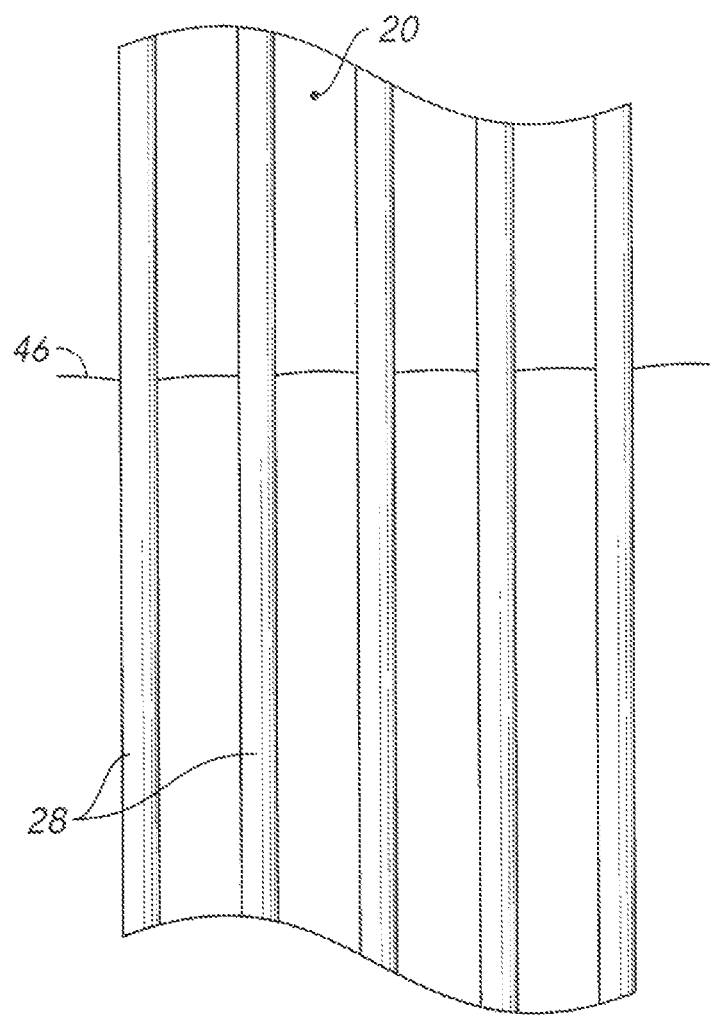
FIG. 4A is a detail view, showing the potting transition with no wicking.

FIG. 4A is a detailed view of five individual filaments 28 as they emerge from the solidified potted region 20. In potted region 20, the filaments are completely encased in solidified potting compound. In the lower portion of the view, the filaments are completely free of the solidified potting compound and are therefore able to flex and stretch freely. The transition occurs at potting compound boundary 46.

FIG. 4A illustrates a scenario in which the potting compound has not wicked along the filaments at all. The potting compound boundary is completely flat. Some degree of wicking is almost always present, so FIG. 4A represents an idealized extreme which—while useful for illustration purposes—is unrealistic. Those skilled in the art can readily appreciate what happens when tension is placed on one of the filaments. The lower portion of the filament is free to elongate. However, the portion contained within the solidified potting compound is much less free to elongate. Thus, a tensile stress riser occurs at potting compound boundary 46. This stress riser can be significant, and it often represents the point of failure in a completed cable termination.

Figure 4B:
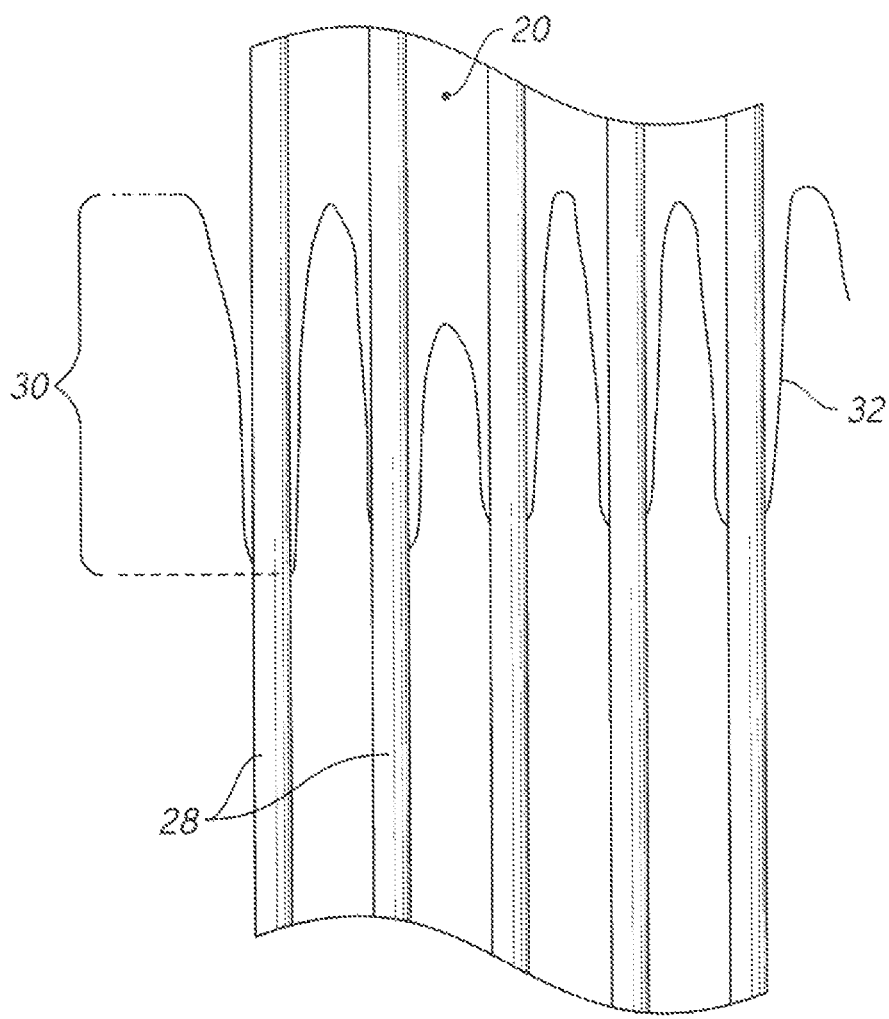
FIG. 4B is a detail view, showing the wicking phenomenon.

FIG. 4B represents a scenario in which the liquid potting compound has undergone fairly uniform wicking prior to solidification. The wicking occurs along a significant length, denoted in the view as wicking potting transition 30. The reader will observe that the advancing potting compound (while still in the liquid state) has advanced along the filaments to form tendrils 32. The depiction is a sectional view. The tendrils will generally surround all of a filament, roughly in a conical shape.

The presence of the tendrils alters the physical characteristics of the filaments across wicking potting transition 30. Rather than the abrupt change in longitudinal stiffness seen across the potting compound boundary in FIG. 4A, the tendrils of FIG. 4B provide a smooth transition between the freely elongating region of filaments and the region of filaments which is locked within the solidified potting compound. The aforementioned stress riser is thereby reduced.

However, the addition of the wicking tendrils causes other design concerns. Still looking at FIG. 4B, if a lateral bending stress is placed on the filaments (meaning a stress resulting from a force that is applied perpendicularly to the central axis of the cable), the tendrils will tend to break. Not only will this eliminate the tensile stress advantage explained previously, it may also produce a disadvantage. The broken shards remaining from the tendrils can actually abrade and break the freely flexing filaments. Thus, while it is important to produce a desired amount of preferably uniform wicking, it is also important to ensure that the wicking potting transition does not undergo lateral or bending forces. The reader should note that the geometry shown in FIG. 4B does not accurately represent a real termination. The voids between adjoining filaments would typically be much smaller than is illustrated. Thus, a broken "shard" of wicking tendril will be trapped between adjoining filaments and will tend to abrade those filaments as the cable moves.

Figure 5:
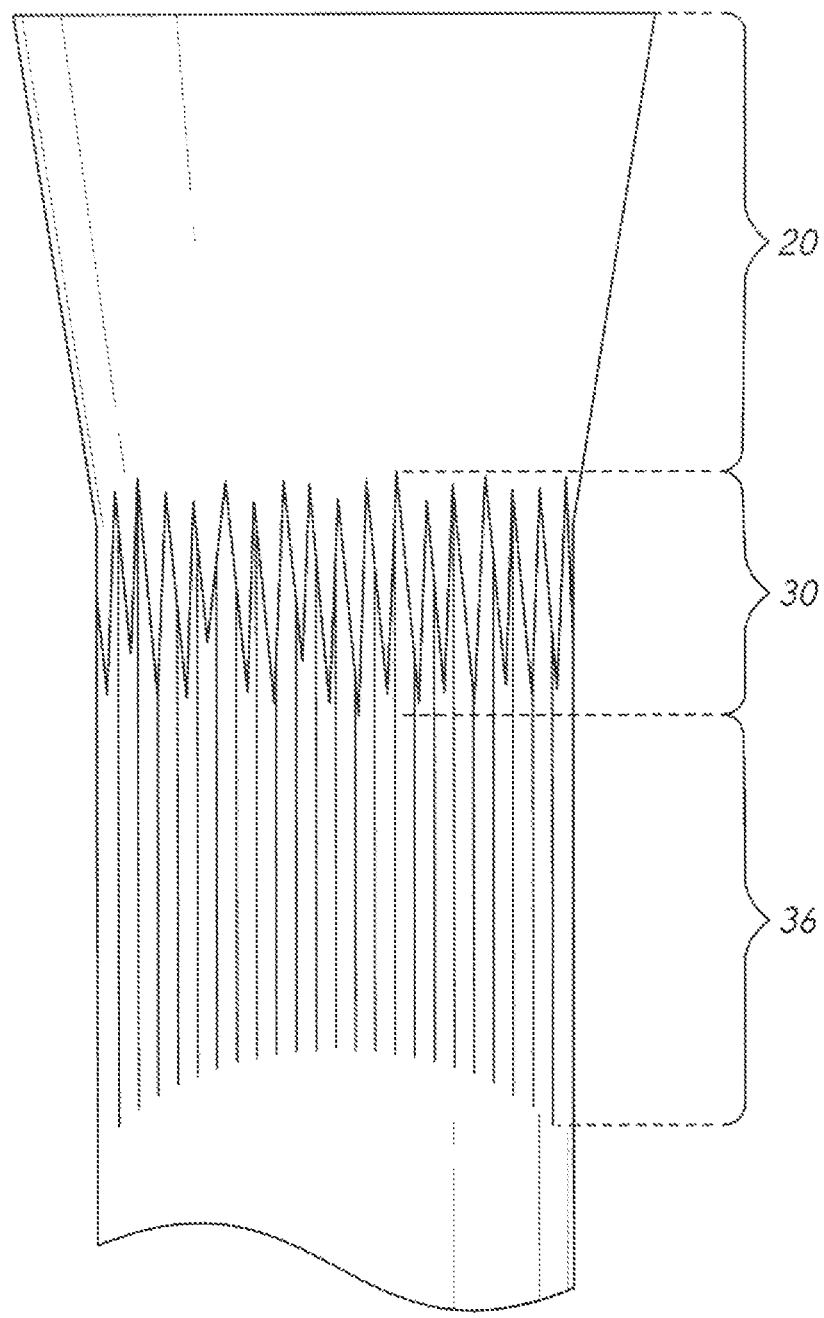
FIG. 5 is an elevation view, showing the position of a wicking potting transition.

FIG. 5 shows the transition between the solidified potting compound and the freely flexing filaments in a global view. Potted region 20 is joined to freely flexing portion 36 by wicking potting transition 30. This transition can occur over a relatively large length. The length will vary according to many factors, including the mechanical properties of the potting compound in its liquid state (viscosity, adhesion, etc.), the filament diameter, the filament material, the degree of filament compaction, the orientation of the assembly while the potting compound is curing, and whether any pressure or vacuum is applied to assist the wicking action. Most cable filaments are packed tightly together, especially when they are contained within a compressive jacket. Thus, the size of the voids lying between the filaments is largely a function of the diameter of the filaments. By controlling the degree of compaction of the filaments (such as by removing a compressive jacket and placing the filaments in a carefully shaped cavity), the voids between the filaments can be given a desired taper and thereby create a desired amount of wicking.

In order to gain the desired advantages, it is necessary for the average tendril length (length of the wicking potting transition) to reach at least twice the individual filament diameter. Longer lengths can provide additional advantages, with certain combinations providing a tendril length up to 1,000 times the filament diameter.

As explained previously, the liquid potting compound transitions to a solid while the wetted filaments are contained within the expanding cavity within the anchor. For most potting compounds some wicking will naturally occur. The present invention seeks to control the wicking by controlling the compression of the cable filaments lying within the anchor. This control can be achieved by carefully shaping the wall profile of the cavity within the anchor. A second approach is to use a separate compression sleeve to control the compression of the cable filaments (discussed subsequently).

Figure 6:
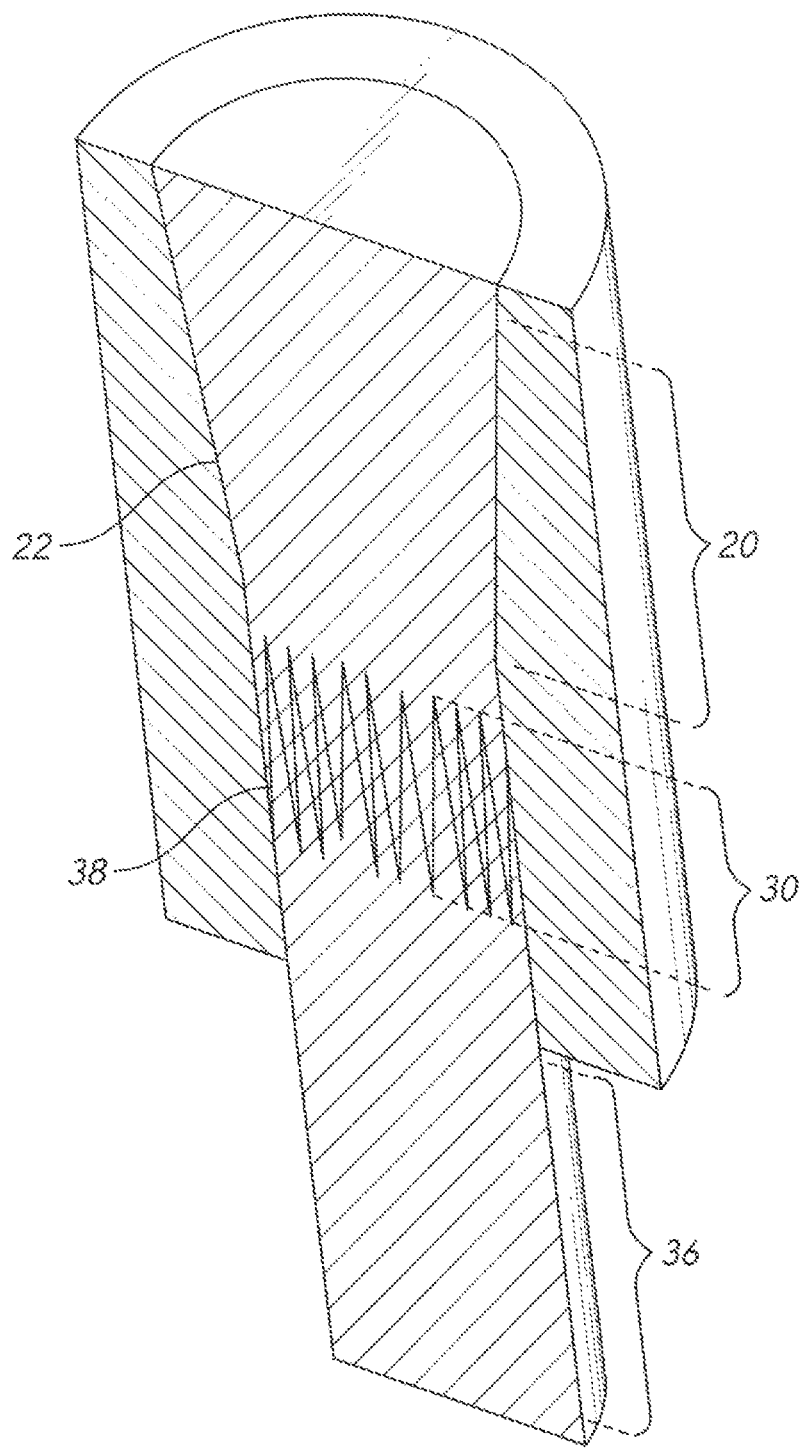
FIG. 6 is a sectioned perspective view, showing the position of a wicking potting transition.

Additionally, the cavity within the anchor can be designed so that the wicking potting transition occurs well within the anchor, leaving a length of filaments proximate the point where the filaments exit the anchor which is entirely free of potting compound. FIG. 6 shows such an embodiment. Potted region 20 primarily lies within expanding cavity 22. Wicking porting transition 30 lies primarily within straight portion 38. Straight portion 38 is extended long enough to accommodate a length of unwetted filaments that are still within the anchor.

These features are significant to the ultimate strength of the termination. If bending stress is placed on the portion of the cable lying outside the anchor, that stress will primarily be transmitted to the anchor by the freely flexing portion of the filaments within the internal cavity (the lower portion in the orientation shown in the view). The filaments within wicking potting transition 30 will primarily experience tensile stress. Thus, the termination shown in FIG. 6 takes advantage of the tensile stress riser reduction obtained by creating tendrils along the wicking potting transition. It also eliminates the inherent drawback in the creation of the tendrils by preventing significant bending stresses in the region of the wicking potting transition.

Figure 7A:
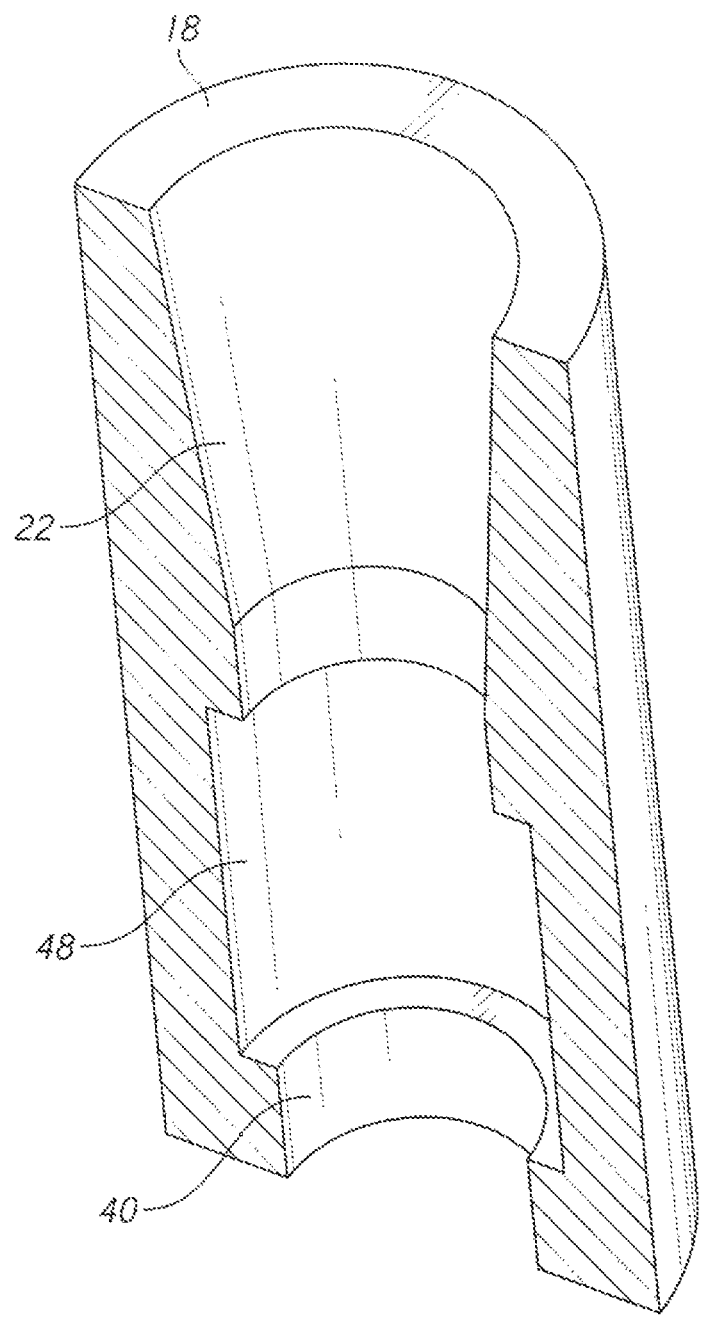
FIG. 7A is a sectioned perspective view, showing the use of a restraining collar.
Figure 7B:
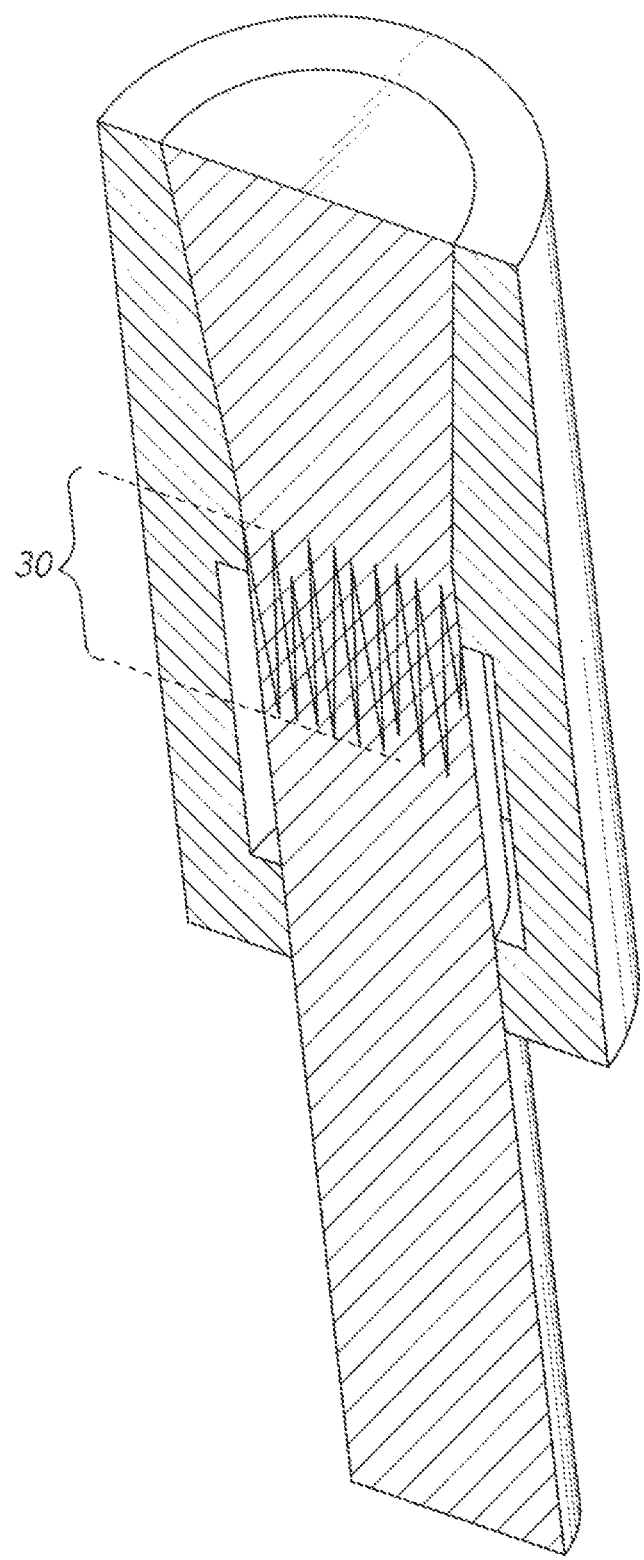
FIG. 7B is a section perspective view, showing a completed termination made with a restraining collar.

Other anchor shapes can be used to achieve these results. FIG. 7A shows an alternate design which includes a cavity 48 and a restraining collar 40. FIG. 7B shows a termination formed using the collar of FIG. 7A. Wicking potting transition 30 again occurs well inside the anchor. Restraining collar 40 prevents lateral flexing of the unwetted filaments within the anchor, so that the wicking potting transition again experiences mainly tensile stresses.

The presence of cavity 48 leaves a length of unrestrained filaments. While it is shown having a significantly larger diameter than the restraining collar, this need not be the case. In some instances, it may be advisable for cavity 48 to have only a slightly enlarged diameter. Even a small increase in diameter can allow the filaments which are bunched lightly near the smallest part of expanding cavity 22 to reexpand somewhat. This reexpansion can be used to promote additional wicking or to provide more controlled and repeatable wicking.

Figure 8:
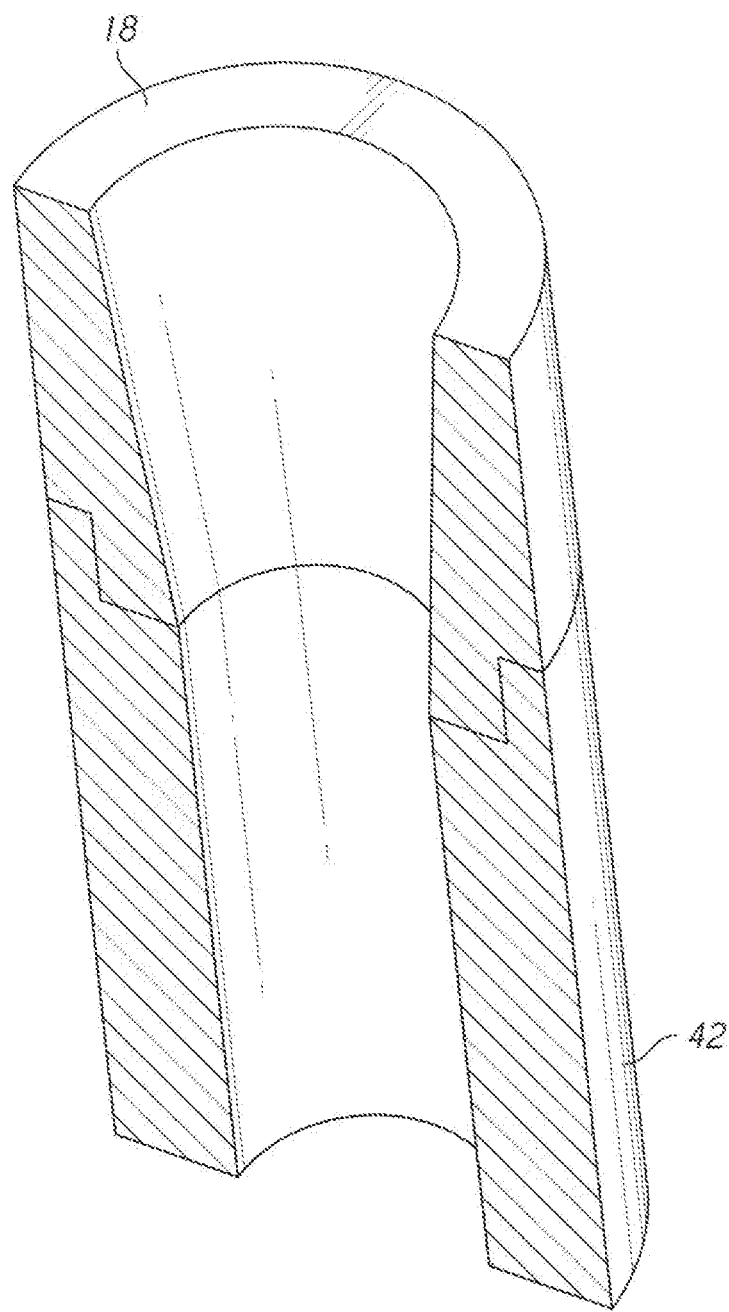
FIG. 8 is a sectioned perspective view, showing a separate restraining collar.

The collar can also be added to conventional anchors as a separate piece. FIG. 8 shows separate collar 42 having a straight portion and attached to one end of anchor 18. The attachment can be made by a thread or other means. The use of a separate collar allows the addition of the features described herein to an existing anchor.

Figure 9:
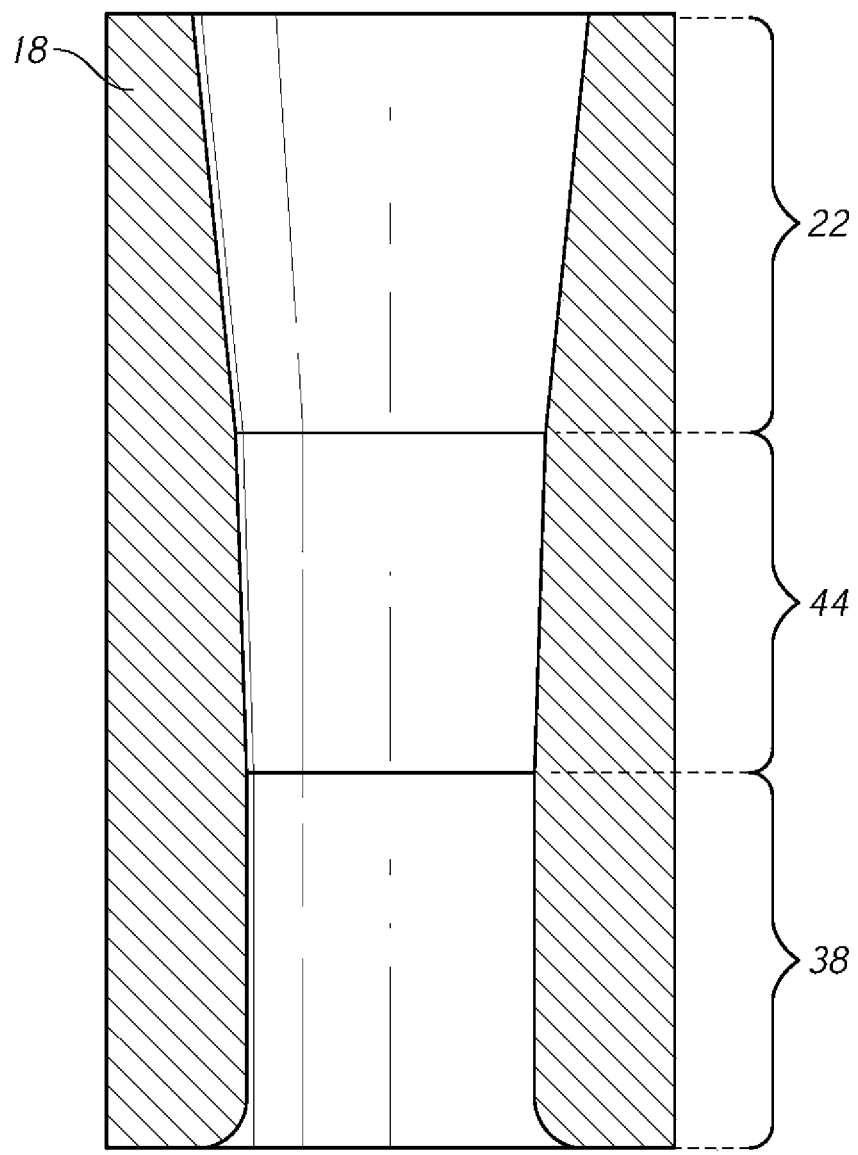
FIG. 9 is a sectioned elevation view, showing a modified anchor.

A more refined shape for the cavity passing through the anchor can be used to regulate and take advantage of the wicking phenomenon. FIG. 9 shows a sectional elevation view of an anchor 18 incorporating such features. It includes a conventional expanding cavity 22. This is a cavity defined by a revolved wall profile having a slope which is sufficient to prevent a solidified potted region (comprised of filaments locked in solidified potting compound) from moving significantly further into the anchor when the cable is placed in tension. Many wall profiles tail be used, including a linear profile or various curved profiles.

The embodiment of FIG. 9 also includes a straight portion 38, as for the embodiments shown in FIGS. 6 and 8. However, the embodiment of FIG. 9 further includes an additional section between the expanding cavity and the straight portion. This additional section is denoted in the view as wicking cavity 44.

The wicking cavity is defined by a revolved wall profile having a slope. Its slope in general is less than the slope found in the expanding cavity. It is configured so that when a portion of a cable is placed within the wicking cavity, the wall profile will gradually compress the cable's filaments when proceeding from top to bottom (in the orientation shown in the view). This compression causes the voids between adjoining filaments to taper when proceeding toward the lower extreme of the wicking cavity. The result is that liquid potting compound which wicks into the voids will tend to progress from top to bottom through the portion of the cable found in the wicking cavity, but will stop before it extends much beyond the lower extreme of the wicking cavity.

The illustrated embodiment uses a linear taper for the wicking cavity. However—as for the expanding cavity—the wall profile can be various curved shapes as well (as shown in the previously referenced and commonly-owned patents). The reader will observe in the view how the wall slope within wicking cavity 44 is less pronounced than the wall slope within expanding cavity 22 (It is closer to being a pure cylinder and is therefore more closely aligned with straight portion 38). There need not be a sharp delineation between expanding cavity 22 and wicking cavity 44. In fact, a smooth transition between the two—such as by the use of a fillet—is often desirable.

Wicking cavity 44 provides a region where the voids between the cable filaments are gradually narrowing toward the fully compressed state they achieve within straight portion 38. The gradually narrowing voids help to consistently share the wicking of the liquid potting compound.

Figure 10:
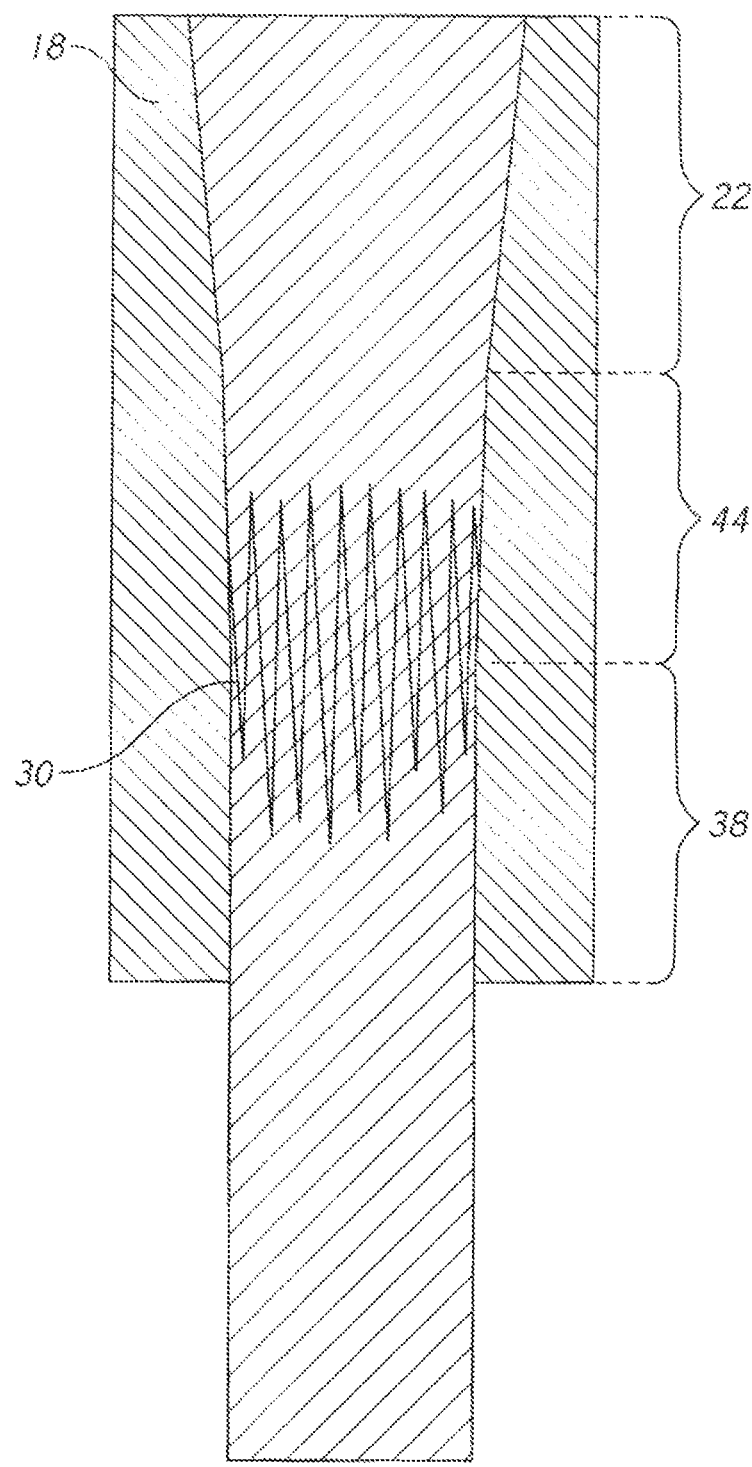
FIG. 10 is a sectioned elevation view, showing the use of the modified anchor in the creation of a termination.

FIG. 10 shows a view of a completed termination made using an anchor with a wicking cavity. The result produced is a consistent and repeatably shaped wicking potting transition 30. The tendrils will be shaped by the voids they occupy. Since each tendril occupies a steadily narrowing void, each tendril will have a steadily narrowing shape. The reader will note how some of the tendrils extend beyond the lower boundary of the wicking cavity and into straight portion 38. The presence of the straight portion helps ensure that no tendrils actually extend out beyond the anchor and into the freely flexing part of the cable. Thus, the embodiment including the straight portion is the preferred embodiment.

Many shapes can be used for the wicking cavity, with some shapes being well suited to certain filament, potting compound combinations. A linear taper can be used for the wall (revolved around an axis of symmetry). Other shapes can be used as well, such as a parabola, a constant radius arc, etc. In some instances it may even be preferable to use a sequence of expanding and contracting regions.

Figure 11:
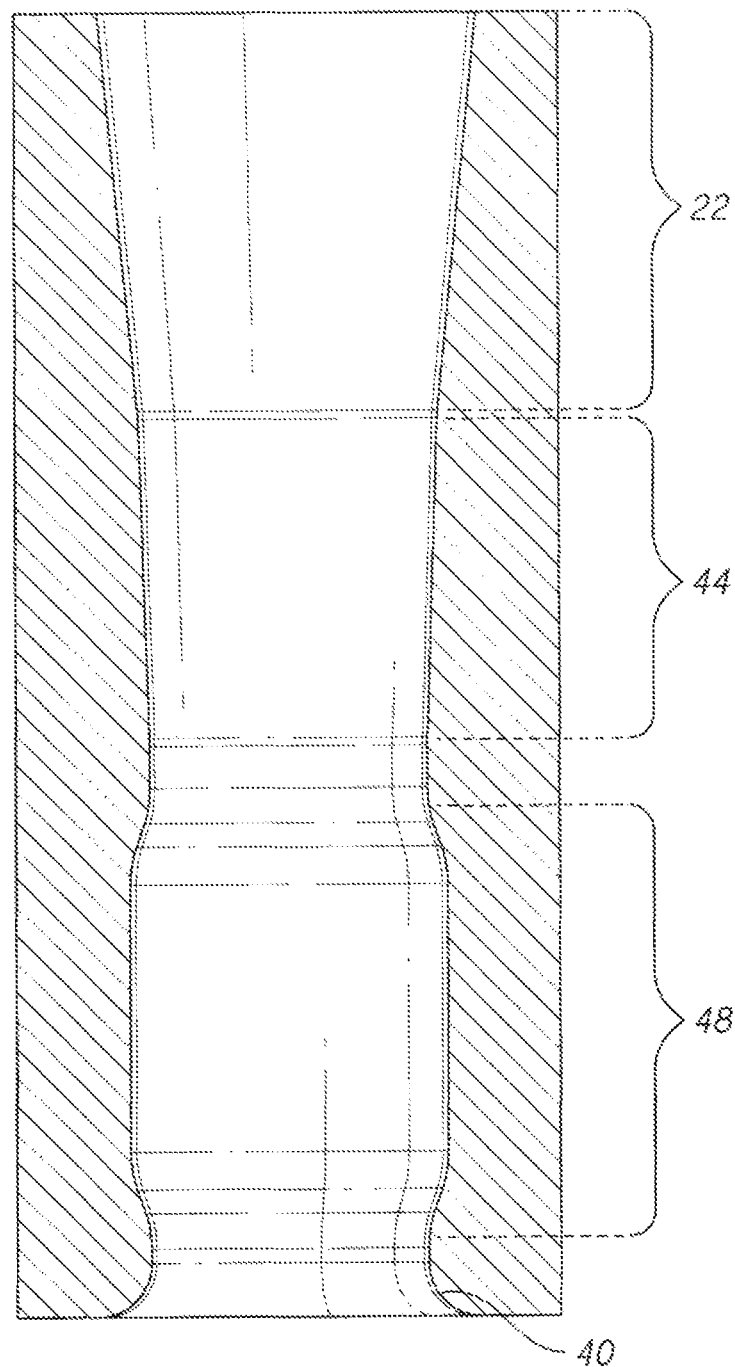
FIG. 11 is a sectioned elevation view, showing the embodiment of FIGS. 9 and 10 with the addition of a restraining collar.

The wicking cavity can be added to the other configurations shown in previous views. FIG. 11 shows an embodiment where a wicking cavity has been included in an anchor which also features a cavity 48 and a restraining collar 40. The various sections have also been joined by fillets to make the transitions between sections smooth. Fillets tend to create a smoother splaying of the fibers during the polling process. They may also assist in the manufacturing of the anchor, particularly where the anchor is turned on a lathe or an automatic screw machine.

In order to create the desired result, a suitable combination of potting compound, anchor geometry, and filament geometry must be selected. As mentioned previously, the filaments of synthetic cables are very fine. The voids between the filaments are typically quite small. Thus, a liquid potting compound having an appropriate viscosity and appropriate adhesion properties will be needed to produce capillary action and the desired wicking effect.

A wide variety of potting compounds are known in the art. Some compounds are designed specifically for wetting, meaning that the compound adheres more strongly to the filaments than to itself. Such a compound will readily wick along the voids.

There are several ways to control the wicking phenomenon. One approach is to use a low viscosity compound with a fast cross-linking time. Such a compound will wick into the filaments but its travel will be limited by the fact that it rapidly transitions to a solid.

Another approach is to use a different type of potting compound. For cross-linking potting compounds, the bulk material is usually called a resin. A hardener is mixed into the resin to start the cross-linking solidification process. The resin is typically a carbon-chain polymer. The hardener is typically a chemical which causes the carbon chains to curl and mechanically interlock to form a solid.

In such a potting compound, the resin often has a higher viscosity than the hardener. A high-viscosity resin can be deliberately mixed with a low-viscosity hardener. The two substances form a colloid (at best), rather than a solution. When the mixture is infused through the filaments within the cavity of the anchor, the low-viscosity hardener will tend to wick through the voids. If the compounds are carefully selected, the result will be a higher concentration of hardener proximate the transition to the freely flexing portion of the cable. Fewer carbon chains will be present in this region.

Of course, the opposite approach can be taken as well. If a combination using a relatively high-viscosity hardener is used, then the wicking region will be occupied by the resin with a relatively low amount of hardener. The result in the wicking region will be a minimally cross-linked solid, which will retain more flexibility than the portion within the balance of the potted region. This result can be advantageous, since greater flexibility within the potting transition is often desirable.

The reverse can also be achieved by mixing a low-viscosity resin with a high-viscosity hardener. That combination would result in a lesser amount of hardener being found in the tendrils. The tendrils would then tend to be more flexible than the balance of the solid potted region.

Gravity can also be used to regulate wicking. If the process begins with the orientation shown in FIG. 5, inverting the assembly can slow the wicking process (although wicking can certainly proceed upward). The potted assembly can even be reoriented one or more times as the liquid potting compound transitions to a solid.

Pressure can likewise be used, if the filaments are infused and the anchor is then locked into a pressurized chamber (with the freely flexing portion of the cable being the vent to the pressurized chamber). Even a relatively high viscosity potting coin pound can be forced through the voids in this case. In reality it is the pressure difference existing between the region of the expanding cavity and the region outside the anchor that causes the desired flow. Thus, vacuum can be applied to create the desired pressure difference as well as the application of a positive pressure.

The differential pressure can be regulated to govern the desired flow. Another option is to use an inert filler material to alter the flow characteristics of the liquid porting compound. As an example, a particulate filler having a particle size only slightly smaller than the voids between adjacent filaments will tend to limit the distance of wicking flow.

Figure 12:
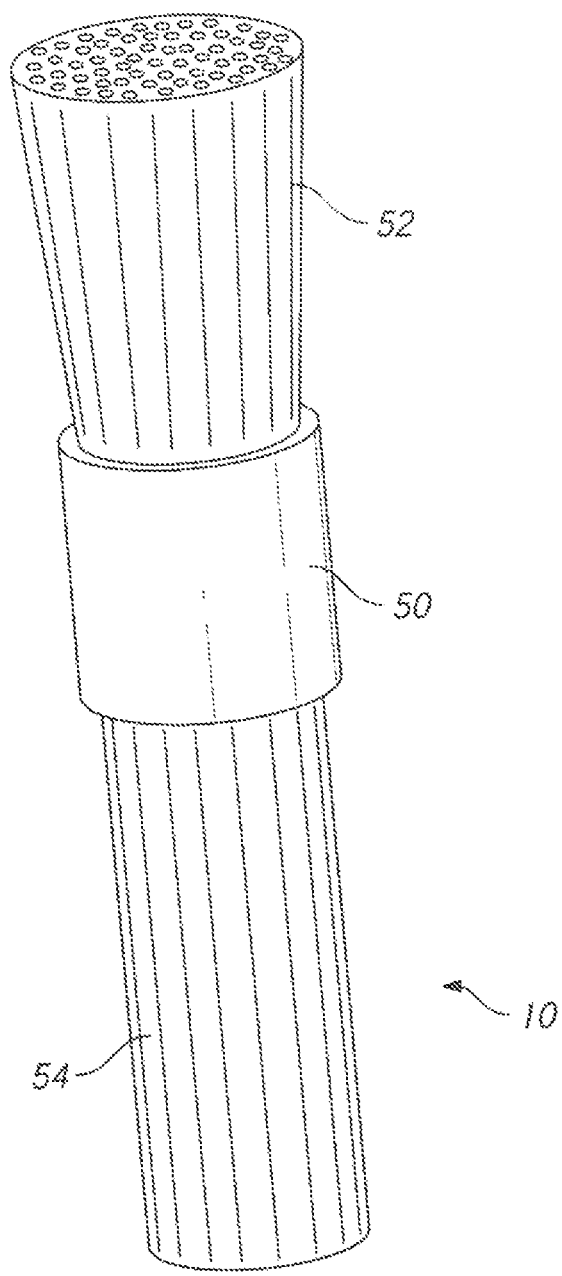
FIG. 12 is a perspective view, showing a compression sleeve in place on a cable.

A synthetic cable is naturally disorganized, especially proximate a sheared end. It may be helpful to use a compression collet or other device during the time when the potting compound is still liquid. Compression devices include tape wraps, string wraps, heat shrink tubing, extruded cable sleeves, braided cable sleeves, overmolded sleeves, and the like. More refined compression states could be created by using a series of abutted compression devices. All these approaches can be used to create a "compression sleeve," which will be understood to broadly encompass any encircling element which urges the individual filaments of a cable together. FIG. 12 shows a cable 10 with a compression sleeve 50 in place. Splayed region 52—wherein the filaments are splayed apart in order to be infused with liquid potting compound—lies bet ween the compression sleeve and the cable's free end. Undisturbed region 54 lies on the opposite side of the compression sleeve.

Figure 13:
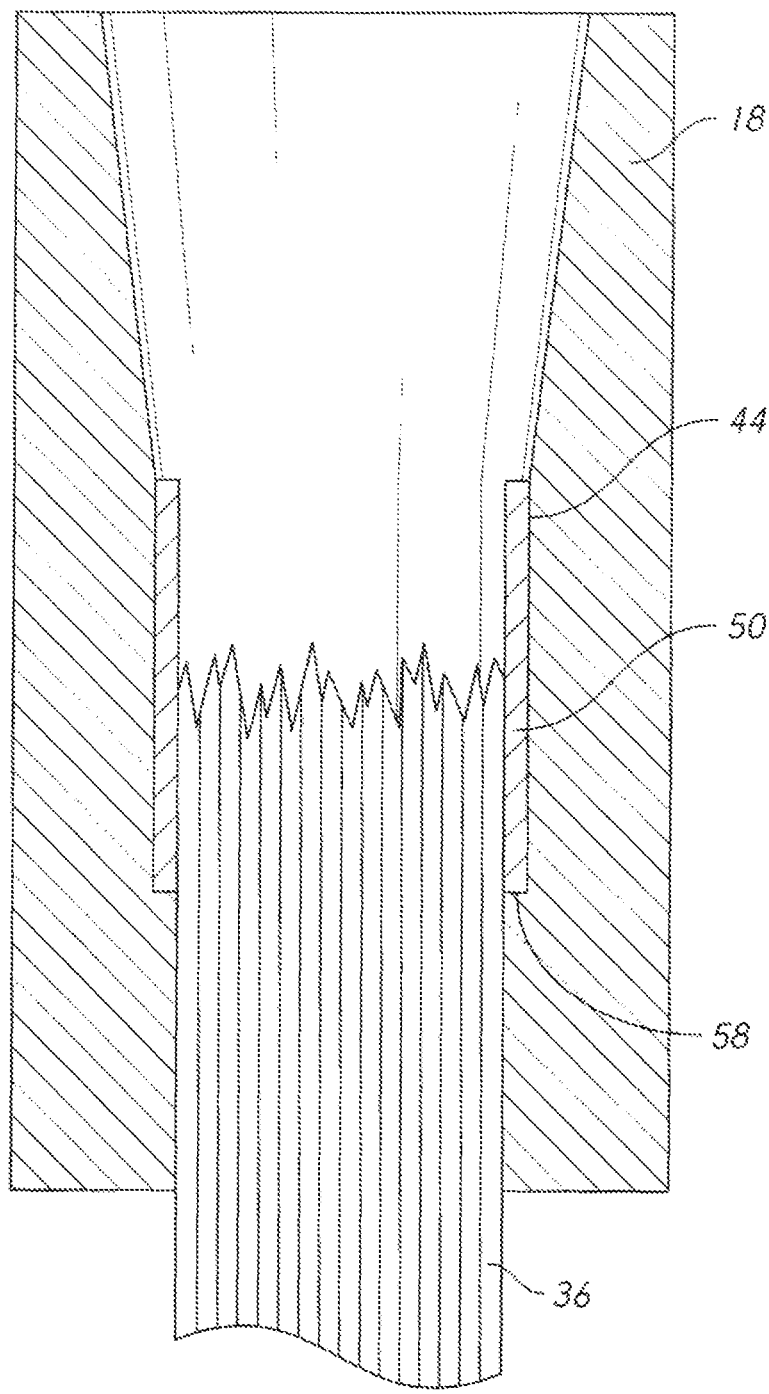
FIG. 13 is a sectional elevation view, showing the position of a compression sleeve inside an anchor.
Figure 14:
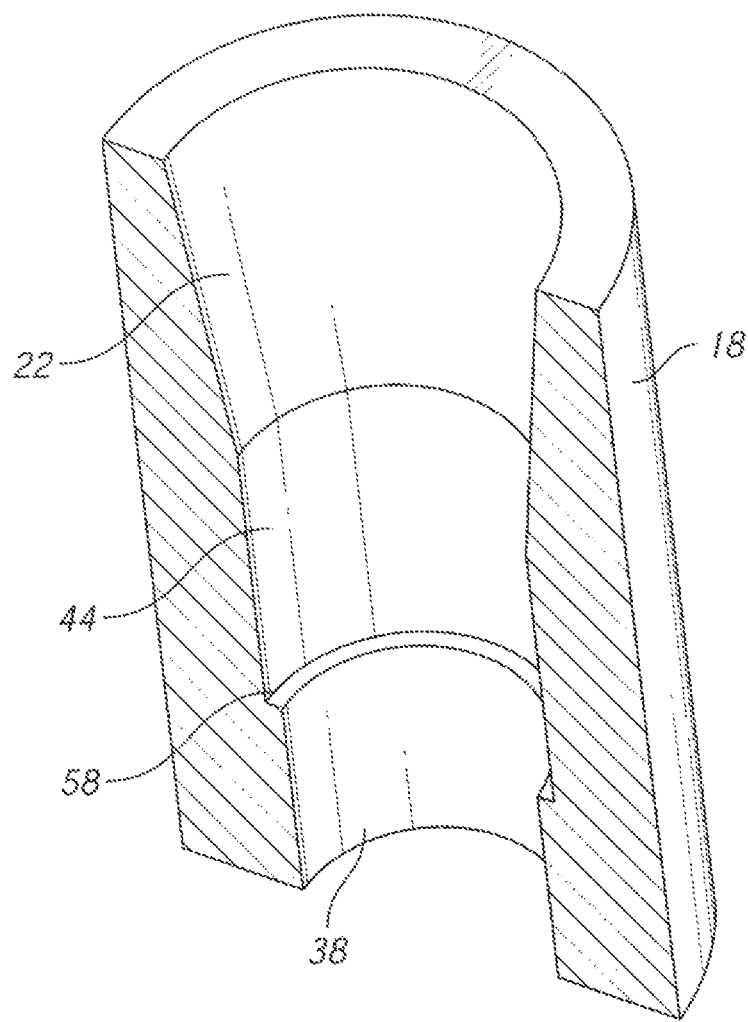
FIG. 14 is a sectional perspective view, showing an anchor having an internal passage configured to receive a compression sleeve.

A compression sleeve can be position to lie completely within an anchor when a termination is complete. FIG. 13 illustrates this configuration in a sectional elevation view of a completed termination. Compression sleeve 50 lies within the wicking cavity and surrounds and compresses the cable filaments in the vicinity of the wicking potting transition. FIG. 14 shows a sectional view of an anchor 18 configured to receive a compression sleeve. As for the previously disclosed embodiments, wicking cavity 44 lies proximate expanding cavity 22. The version illustrated uses only a slight taper for the wicking cavity—having a wall slope of about one degree.

A straight portion 38 is still located proximate the anchor's second end. The joint between the straight portion and the wicking cavity can assume the form of compression sleeve retaining lip 58. This can be used to positively locate the compression sleeve within the anchor. The interface between the retaining lip and the compression sleeve is shown in FIG. 13.

When a compression sleeve is used, the wicking cavity can be tapered quite gently and may in fact have no taper at all (The term "taper"—as mentioned previously—is understood to include linear tapers as well as more complex curved wall profiles). A common method of creating the termination of FIGS. 13 and 14 is to slip the anchor some length down over the cable prior to splaying the filaments proximate the cable's end. Compression sleeve 50 is then added. The splayed filaments are then infused with liquid potting compound. While the filaments are still wet, the anchor is pulled back toward the cable's end. The compression sleeve is pulled into the compression sleeve cavity as the anchor seals into position. The compression sleeve cavity preferably contains a slight taper, so that the compression sleeve creates increasing compression of the cable's filaments proceeding in the direction from the cable's free end toward freely flexing portion 36. Compression sleeve retaining lip 58 locates the compression sleeve with respect to the anchor so that the wicking potting transition can be created in die desired region.

A compression sleeve can be added in many different ways. As one example, a piece of heat shrink tubing can be placed over the cable and heated in a controlled fashion so that it contracts to create a desired tension around the cable. A compression sleeve can also be extruded or molded over the cable. A simpler approach is to use a winding of tape or cord around the cable. Many other methods could be substituted, so long as they create the desired compressive effect.

Figure 15:
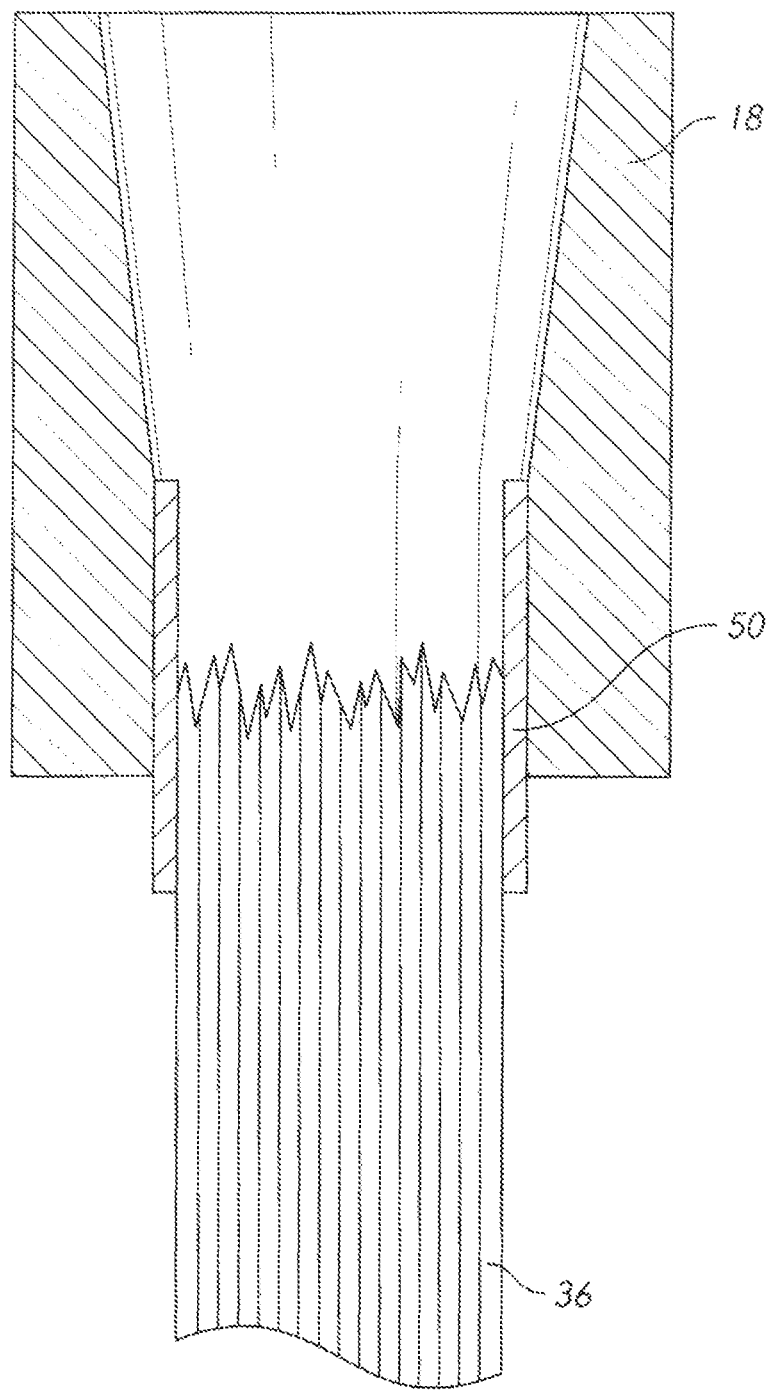
FIG. 15 is a sectional elevation view, showing the formation of a wicking transition using a compression sleeve.

FIGS. 13 and 14 illustrate an embodiment where the removal of the compression sleeve after the potting compound has hardened is impractical, since the sleeve is contained entirely within the anchor. In some applications it may be desirable to remove the compression sleeve once the potting compound has hardened. FIG. 15 shows an alternate embodiment in which the compression sleeve is only partially contained within the anchor. If the sleeve is coated with suitable release agents (and possibly the anchor as well), then the sleeve can be pulled free and removed once the potting compound has hardened.

In some cases the compression sleeve can provide added benefits to the portion of the cable lying outside the anchor.

Such benefits would include abrasion or sunlight resistance. For those instances the compression sleeve could be greatly lengthened. At the extreme, the compression sleeve might extend from one sheared end of the cable all the way to a second sheared end (excluding the length of potted filaments on each end).

The compressive sleeve is useful for controlling how far the liquid potting compound wicks into the unwetted portion of the filaments. It can also be useful in controlling or reducing voids between the filaments. In this context, the term "controlling" refers to shaping the voids between bundled filaments in a desired way so that predictable and repeatable wicking is more likely. In pursuing that objective, it may be advantageous to shape the compressive sleeve in a particular way.

Figure 16:
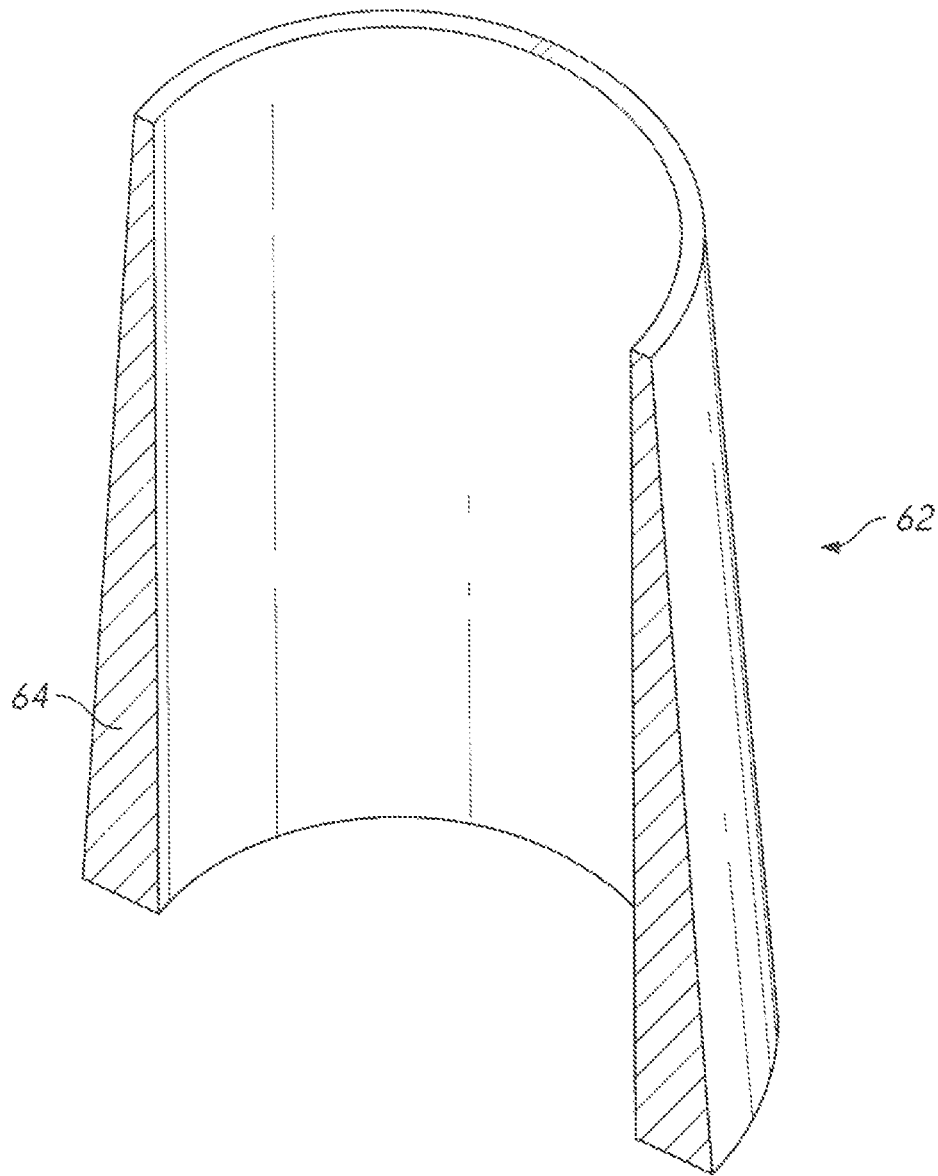
FIG. 16 is a sectional perspective view, showing a compression sleeve with a tapered side wall.

FIG. 16 shows a tapered compression sleeve 62 sectioned in half. The reader will observe that the embodiment shown has a tapered side wall 64. The wall is made of elastic material. The result of such a wall profile is that the thinner portion of the wall (the upper portion in the orientation shown in the view) will provide less compressive force than the thicker portion of the wall. The tapered compressive sleeve would typically be slipped over a cut end of a cable and slid down the cable for a small distance 1 with the thinner wall section being closer to the end of the cable). The filaments on the end of the cable would then be splayed apart and the compressive sleeve would be positioned in order to progressively compress the splayed filaments.

Figure 17:
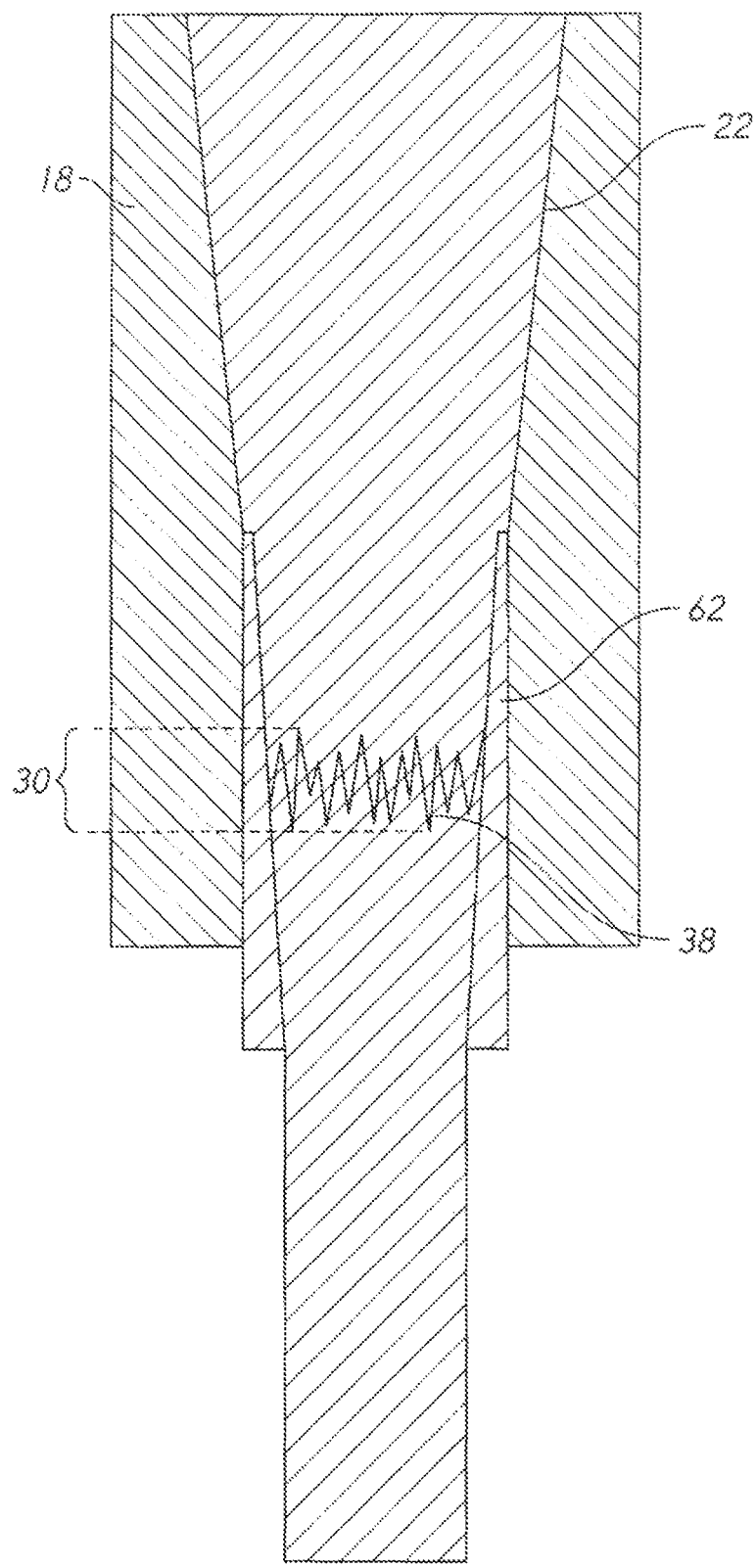
FIG. 17 is a sectional elevation view, showing the tapered compression sleeve of FIG. 17 installed on a cable and potted into an anchor.

The stands would be infused with liquid potting compound and then be placed within the internal passage of an anchor so that the potting compound could transition to a solid while contained within the anchor (The infusion could occur before or after the filaments are placed in the anchor). FIG. 17 shows a sectional elevation view through a resulting potted termination. Tapered compression sleeve 62 is preferably positioned within straight portion 38 of the anchor's internal passage, immediately adjacent to the start of expanding cavity 22. The progressive compression provided by the sleeve (going from lower to higher compression when proceeding downward in the orientation shown in the view) produces a controlled wicking of the potting compound through wicking polling transition 30. The particular tapered compression sleeve is designed to remain in place in the completed termination, but other embodiments in which the sleeve is removable are possible.

The preceding embodiments have illustrated the application of a single anchor to an end of a unitary cable. The present invention has application to many other types of termination. As those skilled in the art will know, many cable include at least one level of sub-grouping of the filaments comprising the cable (many additional layers are known as well).

Figure 18:
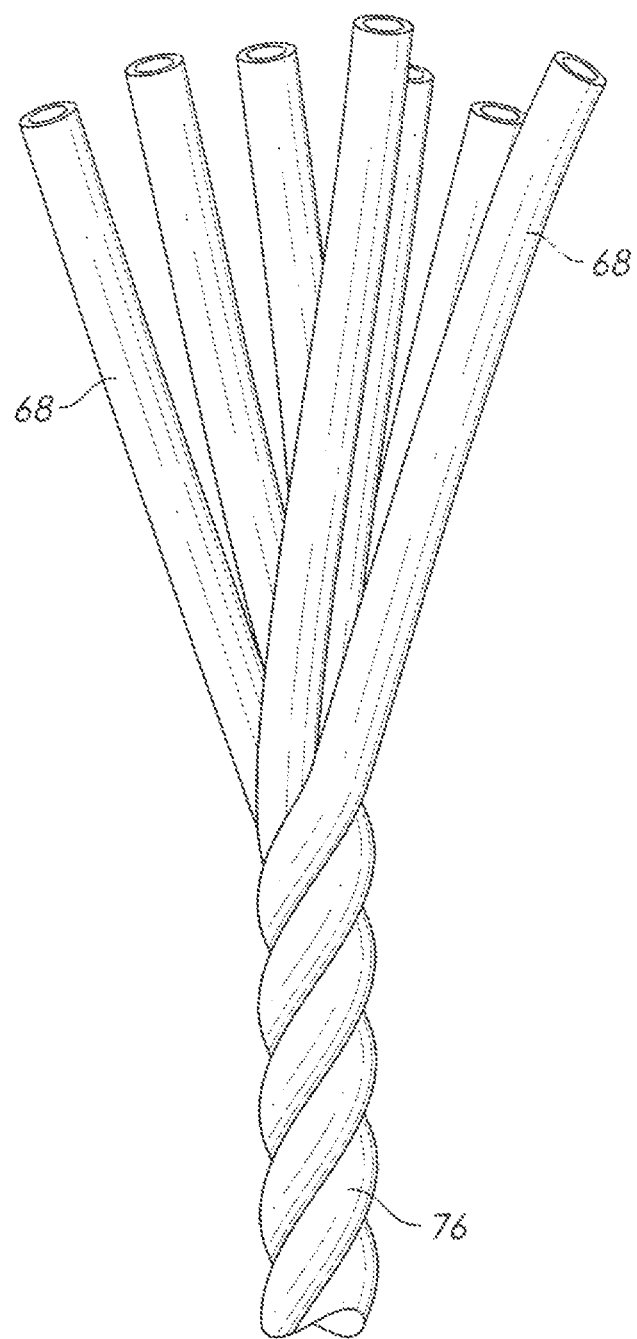
FIG. 18 is a perspective view, showing a multi-stranded cable.

FIG. 1H depicts a cable 76 in which seven individual strands 68 are twisted together to form a helix. This is a very simple construction, as many multi-stranded cables involve a braided pattern of strands. For the example of FIG. 18, the strands near the aid of the cable have been unwound to provide access to the end of each strand. An anchor can be attached to the end of each strand and the anchors can then be gathered together by attaching them to a separate collector.

Figure 19:
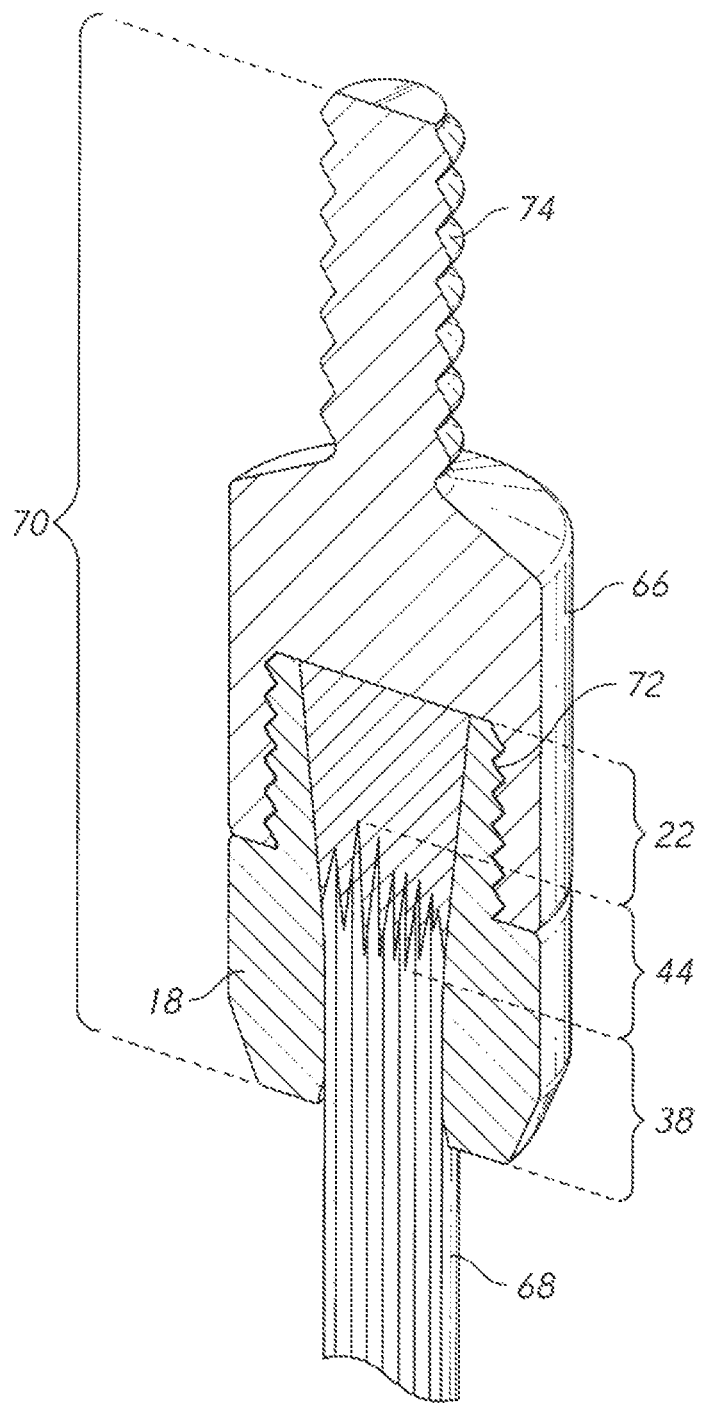
FIG. 19 is a sectional perspective view, showing a strand termination configured for attachment to a collector.

FIG. 19 shows an exemplary strand termination 70 incorporating the present invention. Anchor 18 incorporates a specially-shaped internal passage as described previously. Expanding cavity 22 is used for the creation of the potted interface. Wicking cavity 44 is configured to control the amount of wicking of the potting compound into the freely flexing portion of the cable. Straight portion 38 is provided proximate the wicking cavity.

Figure 20:
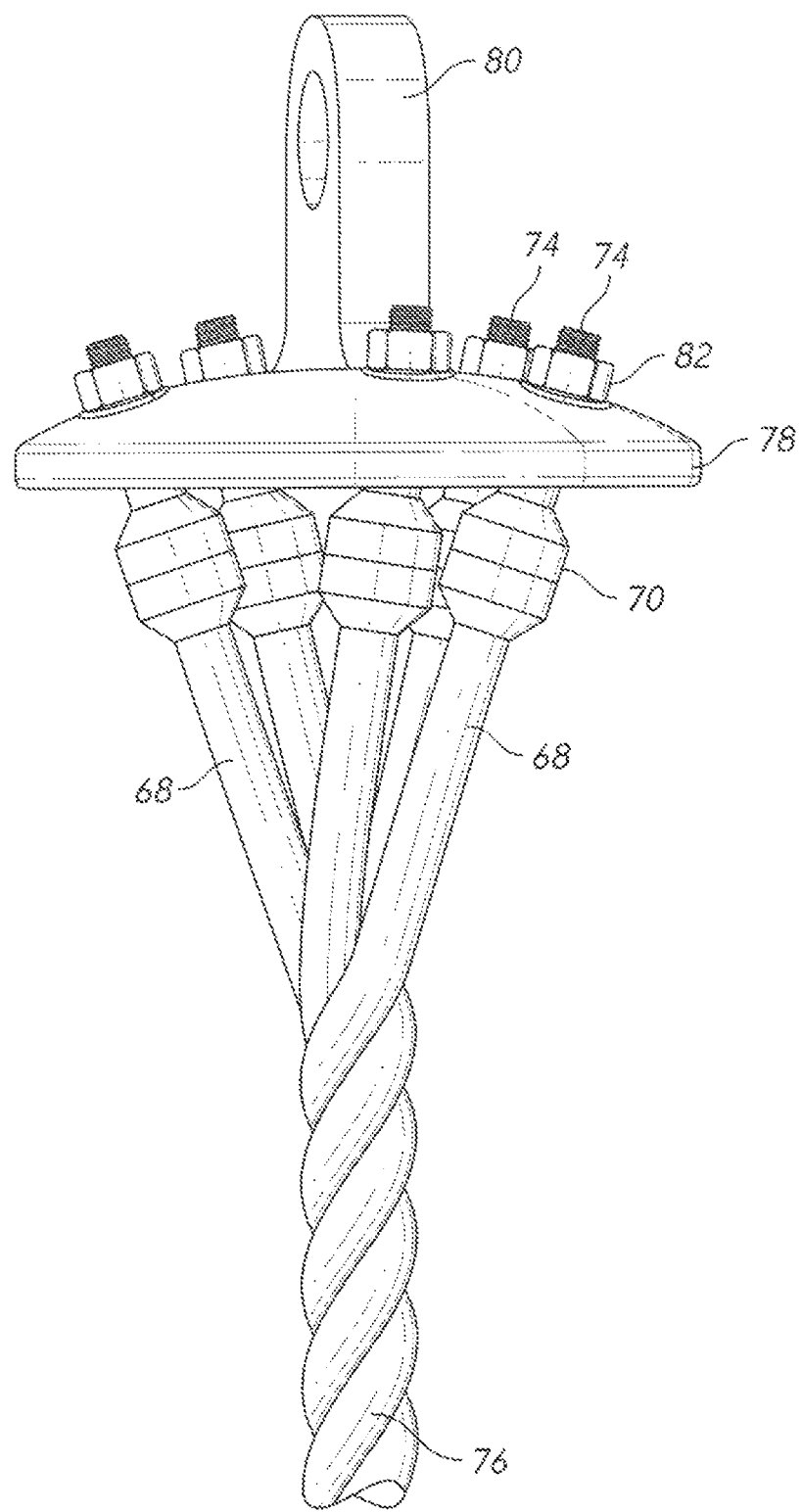
FIG. 20 is an elevation view, showing multiple strand terminations attached to a single collector.

Strand 68 is potted into the anchor as shown. Coupler 66 is provided to link the anchor to a separate collector. Threaded engagement 72 is provided between the anchor and the coupler. Stud 74 extends from coupler 66. FIG. 20 shows a completed assembly in which a strand termination 70 has been added to each strand 68. The Mud 74 on each strand termination has been passed through a hole in collector 78 and a nut 82 has been threaded onto each stud 74 in order to attach the strand terminations to the collector. Loading eye 80 is provided on collector 78 so that the completed assembly can be connected to an external component. The present invention can be used to control a desired amount of wicking in a complex assembly such as shown in FIG. 20—just as for the simpler assemblies illustrated previously.

Figure 21:
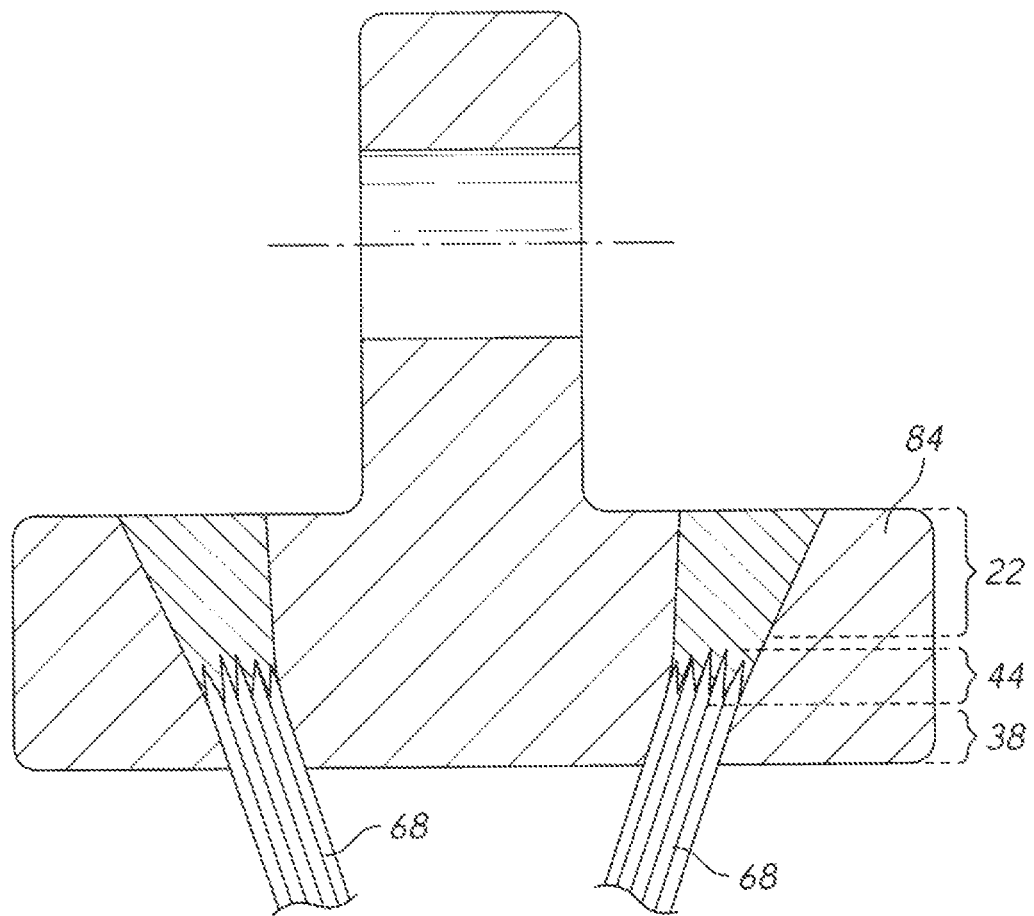
FIG. 21 is a sectional elevation view, showing a multiple cavity anchor.

The present invention can also be applied to a unitary anchor that contains multiple separate potting cavities. FIG. 21 illustrated such a multiple cavity anchor 84. Each cavity includes an expanding cavity, a proximate wicking cavity 44 and a straight portion 38. A strand 68 is potted into each of the cavities. Thus, the unitary anchor shown in FIG. 21 can take the place of the more complex assembly shown in FIG. 20 when dealing with multi-stranded cables. The wicking approach can be used for any of these components.

The present invention tan be combined with many other inventions described in commonly, owned patents. These include:

1. Moldable cable termination systems such as described in commonly-owned U.S. Pat. No. 6,957,485. U.S. Pat. No. 6,957,485 is hereby incorporated by reference. Of particular interest is FIG. 15 of that patent and its related textual descriptions. A mold can be provided to create a molded, hardened composite of filaments and solidified potting compound on the end of a cable or strand. This composite can then be transferred to another anchor (such as by sliding an anchor down the cable before the molding process takes place and sliding the anchor back up and over the molded composite after the molded composite is removed from the mold). The mold in this case can be provided with a suitable wicking cavity or other component to promote the desired degree of wicking.

2. Resin infusion potting systems such as described in commonly-owned U.S. Pat. Nos. 8,048,357 and 8,236,219. Both these patents are hereby incorporated by reference. The cavity in the anchors disclosed in these patent can be provided with a wicking cavity.

3. Translation-based termination optimization systems such as disclosed in U.S. Pat. No. 9,840,044 and pending U.S. application Ser. No. 15/838,457. Both these documents are hereby incorporated by reference. The anchor cavities disclosed in these patent documents can be provided with a wicking cavity.

While it is impractical to illustrate every possible permutation, the reader will understand that the components described can be combined in many different ways and with many other hardware options. Accordingly, the scope of the present invention should thus be defined by the following claims rather than any specific examples given.

Having described my invention, I claim:

1. A termination on a synthetic cable having filaments and an end, comprising:
   a. an anchor, having a first end, a second end, and an internal passage therebetween;
   b. wherein said internal passage includes an expanding cavity proximate said first end of said anchor;

c. wherein a length of exposed filaments proximate said end of said cable is locked into solidified potting compound to form a solidified potted region within said expanding cavity;
d. wherein said expanding cavity is defined by a revolved wall profile having a slope which is sufficient to prevent said solidified potted region from moving significantly toward said second end of said anchor when said cable is placed in tension;
e. wherein said internal passage includes a wicking cavity located between said, expanding cavity and said second end of said anchor;
f. wherein said wicking cavity is defined by a revolved wall profile having a slope which is less than said slope within said expanding cavity, with said slope within said wicking cavity being configured so that when a portion of said cable is placed within said wicking cavity, said filaments of said cable lying within said wicking cavity are gradually compressed together when proceeding in a direction from said first end toward said second end of the anchor, so that voids between said filaments within said wicking cavity diminish when proceeding in the direction from said first end toward said second end of the anchor;
g. wherein a portion of said wicking cavity which is closest to said second end of said anchor is sized to compress said filaments of the cable lying in that said portion of said wicking cavity tightly together, thereby inhibiting wicking of said potting compound, while still in a liquid state, beyond that said portion of said wicking cavity;
h. wherein properties of said potting compound are selected so that said potting compound, while still in said liquid state, wicks through said voids in said wicking cavity in the direction from said first end toward said second end of the anchor, thereby forming a wicking potting transition within said wicking cavity;
i. a straight portion located between said wicking cavity and said second end of said anchor;
j. wherein said straight portion is about a same size as said portion of said wicking cavity which is closest to said second end of said anchor, so that the filaments of the cable lying within said straight portion are compressed tightly together, thereby inhibiting wicking of said potting compound in said liquid state into said straight portion; and
k. a compression sleeve within said wicking cavity.

2. The termination as recited in claim 1, wherein said straight portion is made long enough to prevent any potting compound extending out said second end of said anchor.

3. The termination as recited in claim 2, wherein said straight portion opens into said second end of said anchor, and a joint between said straight portion and said second end of said anchor is rounded.

4. The termination as recited in claim 1, wherein said straight portion opens into said second end of said anchor, and a joint between said straight portion and said second end of said anchor is rounded.

5. The termination as recited in claim 1, wherein said compression sleeve lies entirely within said anchor.

6. The termination as recited in claim 5, wherein said compression sleeve is selected from the group consisting of a wrapping, a length of heat shrink tubing, an extruded section, and an overmolded section.

7. The termination as recited in claim 4, wherein said compression sleeve surrounds said portion of said cable lying within said wicking cavity.

8. The termination as recited in claim 7, wherein said compression sleeve is selected from the group consisting of a wrapping, a length of heat shrink tubing, an extruded section, and an overmolded section.

9. A termination on a synthetic cable having filaments and an end; comprising:
a. an anchor, having a first end, a second end, and an internal passage therebetween;
b. wherein said internal passage includes an expanding cavity proximate said first end of said anchor;
c. wherein a length of exposed filaments proximate said end of said cable is locked into solidified potting compound to form a solidified potted region within said expanding cavity;
d. wherein said expanding cavity is defined by a revolved wall profile having a slope which is sufficient to prevent said solidified potted region from moving significantly toward said second end of said anchor when said cable is placed in tension;
e. wherein said internal passage includes a wicking cavity located between said expanding cavity and said second end of said anchor;
f. wherein said wicking cavity is defined by a revolved wall profile having a slope which is less than said slope within said expanding cavity, with said slope within said wicking cavity being configured so that when a portion of said cable is placed within said wicking cavity, said filaments of said cable lying within said wicking cavity are gradually compressed together when proceeding in a direction from said first end toward said second end of the anchor, so that voids between said filaments within said wicking cavity diminish when proceeding in the direction from said first end toward said second end of the anchor;
g. wherein a portion of said wicking cavity which is closest to said second end of said anchor is sized to compress said filaments of the cable lying in that said portion of said wicking cavity tightly together, thereby inhibiting wicking of said potting compound, while still in a liquid state, beyond that said portion of said wicking cavity;
h. wherein properties of said potting compound are selected so that said potting compound, while still in said liquid state, wicks through said voids in said wicking cavity in the direction from said first end toward said second end of the anchor, thereby forming a wicking potting transition within said wicking cavity; and
i. wherein said anchor includes a compression sleeve contained entirely within said anchor.

10. A termination on a synthetic cable having filaments and an end, comprising:
a. an anchor having a first end, a second end, and an internal passage therebetween;
b. wherein said internal passage includes an expanding cavity proximate said first end of said anchor;
c. wherein a length of exposed filaments proximate said end of said cable is locked into solidified potting compound to form a solidified potted region within said expanding cavity;
d. wherein said expanding cavity is defined by a revolved wall profile having a slope which is sufficient to prevent said solidified potted region from moving significantly toward said second end of said anchor when said cable is placed in tension;

e. wherein said internal passage includes a wicking cavity located between said expanding cavity and said second end of said anchor;
f. wherein said wicking cavity is defined by a revolved wall profile having a slope which is less than said slope within said expanding cavity, with said slope within said wicking cavity being configured so that when a portion of said cable is placed within said wicking cavity, said filaments of said cable lying within said wicking cavity are gradually compressed together when proceeding in a direction from said first end toward said second end of the anchor, so that voids between said filaments within said wicking cavity diminish when proceeding in the direction from said first end toward said second end of the anchor;
g. wherein a portion of said wicking cavity which is closest to said second end of said anchor is sized to compress said filaments of the cable lying in that said portion of said wicking cavity tightly together, thereby inhibiting wicking of said potting compound, while still in a liquid state, beyond that said portion of said wicking cavity;
h. wherein properties of said potting compound are selected so that said potting compound, while still in said liquid state, wicks through said voids in said wicking cavity in the direction from said first end toward said anchor's second end, thereby forming a wicking potting transition within said wicking cavity;
i. wherein said anchor includes a detachable straight portion located between said wicking cavity and said second end of said anchor; and
j. a compression sleeve within said wicking cavity.

11. The termination as recited in claim 10, wherein said compression sleeve extends into said straight portion.

12. The termination as recited in claim 11, wherein said compression sleeve is selected from the group consisting of a wrapping, a length of heat shrink tubing, an extruded section, and an overmolded section.

\* \* \* \* \*